(12) United States Patent
Marukame et al.

(10) Patent No.: US 11,893,476 B2
(45) Date of Patent: *Feb. 6, 2024

(54) PROCESSING APPARATUS AND INFERENCE SYSTEM

(71) Applicant: KABUSHIKI KAISHA TOSHIBA, Tokyo (JP)

(72) Inventors: Takao Marukame, Chuo (JP); Kumiko Nomura, Shinagawa (JP); Yoshifumi Nishi, Yokohama (JP); Koichi Mizushima, Kamakura (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,086

(22) Filed: Nov. 2, 2022

(65) Prior Publication Data
US 2023/0289581 A1    Sep. 14, 2023

Related U.S. Application Data

(63) Continuation of application No. 16/801,275, filed on Feb. 26, 2020, now Pat. No. 11,526,738.

(30) Foreign Application Priority Data

Sep. 17, 2019    (JP) .................................. 2019-168604

(51) Int. Cl.
*G06F 17/00* (2019.01)
*G06N 3/063* (2023.01)
(Continued)

(52) U.S. Cl.
CPC ............. *G06N 3/063* (2013.01); *G06N 3/044* (2023.01); *G06N 3/049* (2013.01); *G06N 3/08* (2013.01)

(58) Field of Classification Search
CPC ........ G06N 3/063; G06N 3/044; G06N 3/049; G06N 3/08
See application file for complete search history.

(56) References Cited

U.S. PATENT DOCUMENTS 5,748,847 A * 5/1998 Lo ............................ G06N 3/08
706/14
9,165,246 B2    10/2015 Pickett
(Continued)

FOREIGN PATENT DOCUMENTS

CN    113228058 A    8/2021
JP    7-182433 A    7/1995
(Continued)

OTHER PUBLICATIONS

Tanaka, G., "Concept of Reservoir Computing and Its Recent Trends," The Journal of Institute of Electronics, Information and Communication Engineers, vol. 102, No. 2, 2019, (with English translation), 14 pages.

*Primary Examiner* — Cheng Yuan Tseng
(74) *Attorney, Agent, or Firm* — Oblon, McClelland, Maier & Neustadt, L.L.P.

(57) ABSTRACT

According to an embodiment, an inference system includes a recurrent neural network circuit, an inference neural network, and a control circuit. The recurrent neural network circuit receives M input signals and outputs N intermediate signals, where M is an integer of 2 or more and N is an integer of 2 or more. The inference neural network circuit receives the N intermediate signals and outputs L output signals, where L is an integer of 2 or more. The control circuit adjusts a plurality of coefficients that are set to the recurrent neural network circuit and adjusts a plurality of coefficients that are set to the inference neural network circuit. The control circuit adjusts the coefficients set to the recurrent neural network circuit according to a total delay (Continued)

time period from timing for applying the M input signals until timing for firing the L output signals.

15 Claims, 18 Drawing Sheets

(51) Int. Cl.
*G06N 3/08* (2023.01)
*G06N 3/049* (2023.01)
*G06N 3/044* (2023.01)

(56) References Cited

U.S. PATENT DOCUMENTS

| | | | |
|---|---|---|---|
| 10,175,947 | B1 | 1/2019 | Marukame et al. |
| 10,325,223 | B1* | 6/2019 | Arel ........................ G06N 3/044 |
| 10,783,452 | B2* | 9/2020 | Kajino ..................... G06N 3/08 |
| 11,199,147 | B2* | 12/2021 | Aso ..................... F02D 41/1405 |
| 11,386,307 | B2* | 7/2022 | Batchelor ............... G06F 17/13 |
| 11,526,738 | B2* | 12/2022 | Marukame ............... G06N 3/08 |
| 2017/0364791 | A1 | 12/2017 | Miyashita et al. |
| 2018/0211154 | A1 | 7/2018 | Mori et al. |
| 2019/0156181 | A1 | 5/2019 | Marukame et al. |
| 2020/0026496 | A1 | 1/2020 | Marukame et al. |
| 2020/0034695 | A1 | 1/2020 | Marukame et al. |
| 2020/0293861 | A1 | 9/2020 | Marukame et al. |
| 2020/0379733 | A1 | 12/2020 | Berdan et al. |
| 2020/0380335 | A1* | 12/2020 | Neznal ................... G06N 3/044 |
| 2020/0380347 | A1 | 12/2020 | Marukame et al. |
| 2021/0056383 | A1 | 2/2021 | Nishi et al. |
| 2021/0081771 | A1* | 3/2021 | Marukame ............. G06N 3/063 |
| 2021/0295668 | A1 | 9/2021 | Blanchard |

FOREIGN PATENT DOCUMENTS

| | | |
|---|---|---|
| JP | 2006-293442 A | 10/2006 |
| JP | 2017-228295 A | 12/2017 |
| JP | 2018-120433 A | 8/2018 |
| JP | 2019-53563 A | 4/2019 |
| JP | 2019-95860 A | 6/2019 |
| JP | 2020-13398 A | 1/2020 |
| JP | 2020-17114 A | 1/2020 |
| JP | 2020-149625 A | 9/2020 |
| JP | 2020-197761 A | 12/2020 |
| JP | 2020-197922 A | 12/2020 |
| JP | 2021-33415 A | 3/2021 |
| WO | 2020-261549 A1 | 12/2020 |

* cited by examiner

US 11,893,476 B2

PROCESSING APPARATUS AND INFERENCE SYSTEM

CROSS-REFERENCE TO RELATED APPLICATIONS

This application is a continuation of and claims benefit under 35 U.S.C. § 120 to U.S. application Ser. No. 16/801,275, filed Feb. 26, 2020, which is based upon and claims the benefit of priority under 35 U.S.C. § 119 to Japanese Patent Application No. 2019-168604, filed on Sep. 17, 2019, the entire contents of each of which are incorporated herein by reference.

FIELD

Embodiments described herein relate generally to a processing apparatus and an inference system.

BACKGROUND

In recent years, reservoir computing, in which inference processing such as time-series data recognition and pattern recognition, and the like, is executed with respect to a signal obtained by transforming an input signal by a reservoir, has attracted attention. A reservoir is realized as a type of recurrent neural network. This kind of reservoir is capable of outputting a signal obtained by using nonlinear transformation to project an input signal onto a feature space accompanied by high-dimension and timewise information. Thus, reservoir computing enables high-speed learning by a simple algorithm.

Furthermore, the characteristics of a reservoir vary according to the task to be handled, the type of data, and the like. Hence, it is desirable to suitably adjust a reservoir in accordance with the task to be handled, the type of data, and the like, to enable inference to be performed accurately.

BRIEF DESCRIPTION OF THE DRAWINGS

FIG. 7 is a diagram illustrating a function configuration of a control circuit together with a reservoir circuit and the like;

DETAILED DESCRIPTION

According to an embodiment, an inference system includes a recurrent neural network circuit and a control circuit. The recurrent neural network circuit receives M first signals and outputs N second signals, where M is an integer of 2 or more and N is an integer of 2 or more. The control circuit adjusts a plurality of coefficients that is set to the recurrent neural network circuit according to a first delay time period from timing for applying the M first signals until timing for firing the N second signals. An inference system 10 according to an embodiment will be described below with reference to the drawings.

Figure 1:
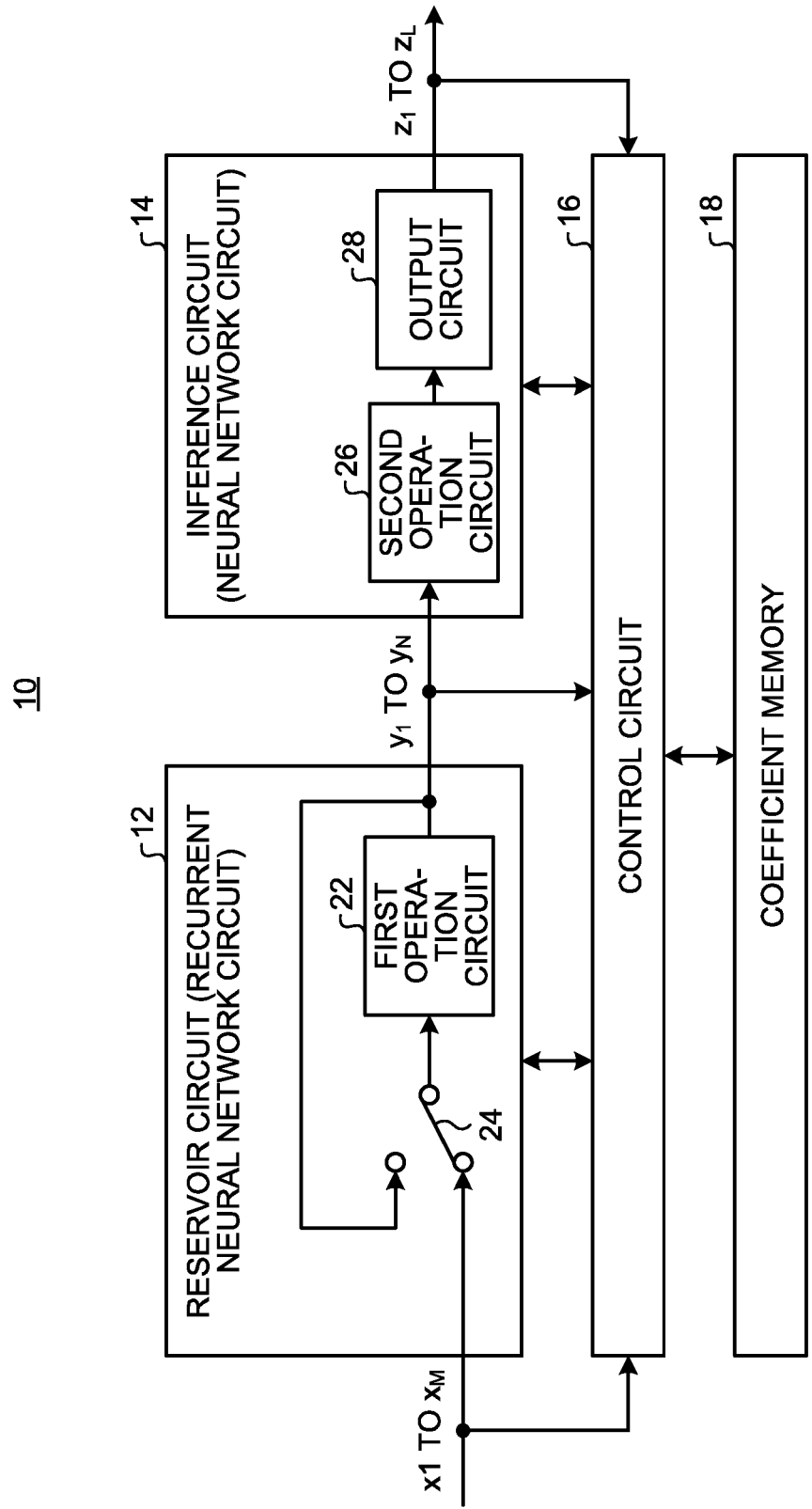
FIG. 1 is a diagram illustrating a configuration of an inference system.

FIG. 1 is a diagram illustrating a configuration of the inference system 10 according to the embodiment. The inference system 10 receives input data and outputs output data according to the received input data. For example, the inference system 10 receives time-series input data and outputs time-series output data that represents the results of performing pattern recognition on the received time-series input data.

Note that a signal representing a binary value is a signal that represents a first logical value (logic L, 0, −1, for example) or a second logical value (logic H, 1, +1, for example). Here, combinations of L and H mean that L is 0 and H is 1, or L is −1 and H is +1. Furthermore, when a signal is applied to a circuit, this means that the signal that is input to the circuit changes from the first logical value to the second logical value or from the second logical value to the first logical value. In addition, when a circuit causes a signal to be fired, this means that the signal that is output from the circuit changes from the first logical value to the second logical value or from the second logical value to the first logical value.

The inference system 10 includes a reservoir circuit 12, an inference circuit 14, a control circuit 16, and a coefficient memory 18.

The reservoir circuit 12 is a recurrent neural network circuit that performs a product-sum operation by an analog circuit. The reservoir circuit 12 has a plurality of coefficients that is set. The reservoir circuit 12 holds the plurality of set coefficients by an analog device such as a variable resistor or a capacitor.

The reservoir circuit 12 receives M input signals ($x_1$ to $x_M$), which correspond to input data, from an earlier-stage data processing device. The M input signals each represent a binary value. For example, the reservoir circuit 12 receives the M input signals as M input signals representing the respective bit values of M-bit input data.

The reservoir circuit 12 outputs N (N is an integer of 2 or more) intermediate signals ($y_1$ to $y_N$) that correspond to the M input signals thus received. The N intermediate signals each represent a binary value.

For example, the reservoir circuit 12 includes a first operation circuit 22 and a switching circuit 24. The first operation circuit 22 executes a neural network operation in which M input signals are received and N intermediate signals are output. For example, by performing a product-sum operation by an analog circuit, the first operation circuit 22 executes a neural network operation which is not recursive.

Upon receiving input data from the earlier-stage data processing device, the switching circuit 24 supplies, to the first operation circuit 22, M input signals according to the input data. After supplying, to the first operation circuit 22, the M input signals according to the input data, the switching circuit 24 feeds back N intermediate signals that are output from the first operation circuit 22 and supplies the N intermediate signals to the first operation circuit 22 as M input signals. Until the next input data is received from the earlier-stage data processing device, the switching circuit 24 feeds back the N intermediate signals and supplies the N intermediate signals to the first operation circuit 22 as M input signals. Then, upon receiving the next input data from the earlier-stage data processing device, the switching circuit 24 supplies M input signals according to the next input data to the first operation circuit 22.

According to the present embodiment, M=N, and one-to-one correspondence exists between the M input signals and the N intermediate signals. Thus, according to the present embodiment, the switching circuit 24 supplies each of the N intermediate signals to the first operation circuit 22 as the corresponding input signal among the M input signals. Note that M=N is not necessarily required for the relationship between M and N. In this case, the switching circuit 24 may generate one input signal by mixing two or more intermediate signals or may generate two or more input signals by dividing one intermediate signal.

The inference circuit 14 is a neural network circuit (an inference neural network circuit). The inference circuit 14 may also be any neural network. According to the present embodiment, the inference circuit 14 is a neural network circuit that performs a product-sum operation by an analog circuit. The inference circuit 14 has a plurality of coefficients that is set. According to the present embodiment, the inference circuit 14 holds the plurality of set coefficients by an analog device such as a variable resistor or a capacitor.

The inference circuit 14 receives N intermediate signals ($y_1$ to $y_N$) from the reservoir circuit 12. The inference circuit 14 outputs L (L is an integer of 2 or more) output signals ($z_1$ to $z_L$) according to the received N intermediate signals. The L output signals each represent a binary value.

For example, the inference circuit 14 includes a second operation circuit 26 and an output circuit 28. The second operation circuit 26 executes a neural network operation in which N intermediate signals are received and L signals are output. For example, by performing a product-sum operation by an analog circuit, the second operation circuit 26 executes a neural network operation which is not recursive.

The output circuit 28 generates and outputs L output signals that correspond to the L signals that are output from the second operation circuit 26. Because the reservoir circuit 12 is a recurrent neural network circuit, one or a plurality of intermediate signals among the N intermediate signals have a possibility of being fired repeatedly. If such N intermediate signals are applied, the second operation circuit 26 has a possibility of repeatedly firing one or a plurality of signals among the L signals. Thus, the output circuit 28 causes each of the L output signals to be fired according to a firing pattern for the corresponding signal among the L signals that are output from the second operation circuit 26.

For example, if the firing pattern of one signal among the L signals that are output from the second operation circuit 26 coincides with a predetermined pattern, the output circuit 28 causes the corresponding output signal among the L output signals to be fired. Furthermore, for example, the output circuit 28 integrates respective firing amounts of the L signals that are output from the second operation circuit 26 and fires the output signal which corresponds to a signal, the integral value of which exceeds a predetermined value, among the L output signals. In addition, for example, the output circuit 28 may detect time ratios of the respective firing amounts of the L signals that are output from the second operation circuit 26 and fires the output signal which corresponds to a signal, the firing amount time ratio of which exceeds a predetermined value, among the L output signals.

The control circuit 16 adjusts a plurality of coefficients set to the reservoir circuit 12 in learning processing. Note that the control circuit 16 may also execute learning processing in advance of inference processing or may execute learning processing in real time in parallel with inference processing.

The coefficient memory 18 stores a plurality of digital coefficient values for which there is one-to-one correspondence with the plurality of coefficients set to the reservoir circuit 12. The coefficient memory 18 stores a plurality of digital coefficient values for which there is one-to-one correspondence with the plurality of coefficients set to the inference circuit 14. The control circuit 16 adjusts the plurality of digital coefficient values stored in the coefficient memory 18, in learning processing. Further, the control circuit 16 changes, on the basis of the adjusted plurality of digital coefficient values, the plurality of coefficients set to the reservoir circuit 12 and the plurality of coefficients set to the inference circuit 14.

Note that the numbers of gradations of the respective pluralities of coefficients set to the reservoir circuit 12 and the inference circuit 14 may differ from the number of gradations of the plurality of digital coefficient values stored in the coefficient memory 18. For example, according to the present embodiment, the respective pluralities of coefficients set to the reservoir circuit 12 and the inference circuit 14 are represented by a binary value (a first gradation number). In addition, the plurality of digital coefficient values stored in the coefficient memory 18 is each represented by eight bits (a second gradation number) which is greater than the first gradation number. The control circuit 16 transforms each of the plurality of digital coefficient values stored in the coefficient memory 18 into the first gradation number and, on the basis of the plurality of digital coefficient values represented by the first gradation number, changes the plurality of coefficients set to the reservoir circuit 12 or the inference circuit 14.

Figure 2:
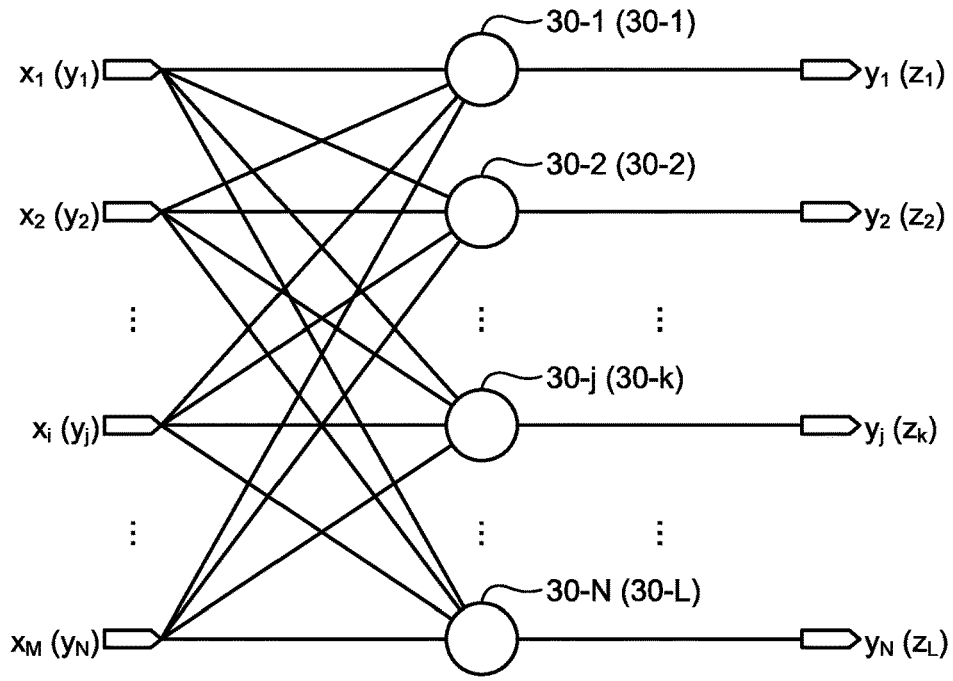
FIG. 2 is a diagram illustrating a configuration of a first operation circuit and a second operation circuit.

FIG. 2 is a diagram illustrating a configuration of the first operation circuit 22 which the reservoir circuit 12 includes. The first operation circuit 22 which the reservoir circuit 12 includes has N product-sum operation circuits 30 (30-1 to 30-N) that correspond to N intermediate signals ($y_1$ to $y_N$). A jth product-sum operation circuit 30-$j$ among the N product-sum operation circuits 30 corresponds to a jth intermediate signal ($y_j$). Furthermore, the N product-sum operation circuits 30 each receive M input signals ($x_1$ to $x_M$).

Note that, in FIG. 2, the reference signs in brackets denote constituent elements of the second operation circuit 26 which the inference circuit 14 includes. The second operation circuit 26 which the inference circuit 14 includes has L product-sum operation circuits 30 (30-1 to 30-L) that correspond to L output signals ($z_1$ to $z_L$). A kth product-sum operation circuit 30-$k$ among the L product-sum operation circuits 30 corresponds to a kth output signal ($z_k$). Furthermore, the L product-sum operation circuits 30 each receive N intermediate signals ($y_1$ to $y_N$).

Figure 3:
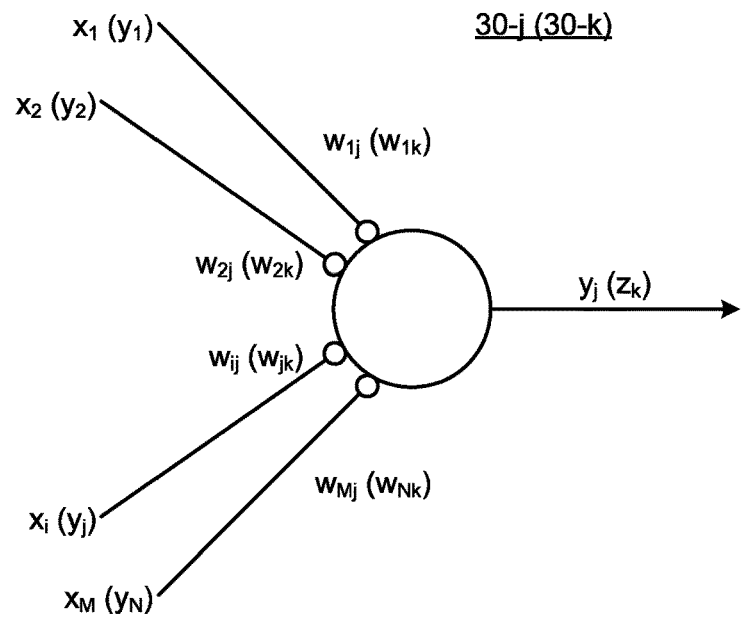
FIG. 3 is a diagram describing a product-sum operation by a product-sum operation circuit.

FIG. 3 is a diagram to describe a product-sum operation by a product-sum operation circuit 30. M coefficients ($w_{1j}$, $w_{2j}$, ..., $w_{ij}$, ..., $w_{Mj}$), which correspond to the M input signals, are set to each of the N product-sum operation circuits 30 which the first operation circuit 22 of the reservoir circuit 12 includes.

The N product-sum operation circuits 30 each output an intermediate signal which is obtained by binarizing a value obtained by performing a product-sum operation with respect to M input signals and M set coefficients. For example, a product-sum operation circuit 30-$j$, which corresponds to a jth intermediate signal, executes an analog operation of the following equation (1).

$$y_j = f\left(\sum_{i=1}^{M} x_i w_{ij}\right) \quad (1)$$

In equation (1), $y_j$ represents the jth intermediate signal. $x_i$ represents the ith (i is an integer of 1 or more and M or less) input signal. $w_{ij}$ represents a coefficient multiplied by the ith input signal, among M coefficients. In equation (1), f(X) represents a function for binarizing a value X in brackets, using a predetermined threshold value.

Note that, in FIG. 3, the reference signs in brackets denote constituent elements of the inference circuit 14. The L product-sum operation circuits 30 which the second operation circuit 26 of the inference circuit 14 includes each have N coefficients ($w_{1k}$, $w_{2k}$, ..., $w_{jk}$, ..., $w_{Nk}$) which correspond to the N intermediate signals, which are set.

The L product-sum operation circuits 30 each output an output signal which is obtained by binarizing a value obtained by performing a product-sum operation with respect to N intermediate signals and set N coefficients. For example, a product-sum operation circuit 30-$k$, which corresponds to a kth output signal, executes an analog operation of the following equation (2).

$$z_k = f\left(\sum_{j=1}^{N} y_j w_{jk}\right) \quad (2)$$

In equation (2), $z_k$ represents the kth (k is an integer of 1 or more and L or less) output signal. $y_j$ represents the jth (j is an integer of 1 or more and N or less) intermediate signal. $w_{jk}$ represents a coefficient multiplied by the jth intermediate signal, among N coefficients. In equation (2), f(X) represents a function for binarizing a value X in brackets, using a predetermined threshold value.

Figure 4:
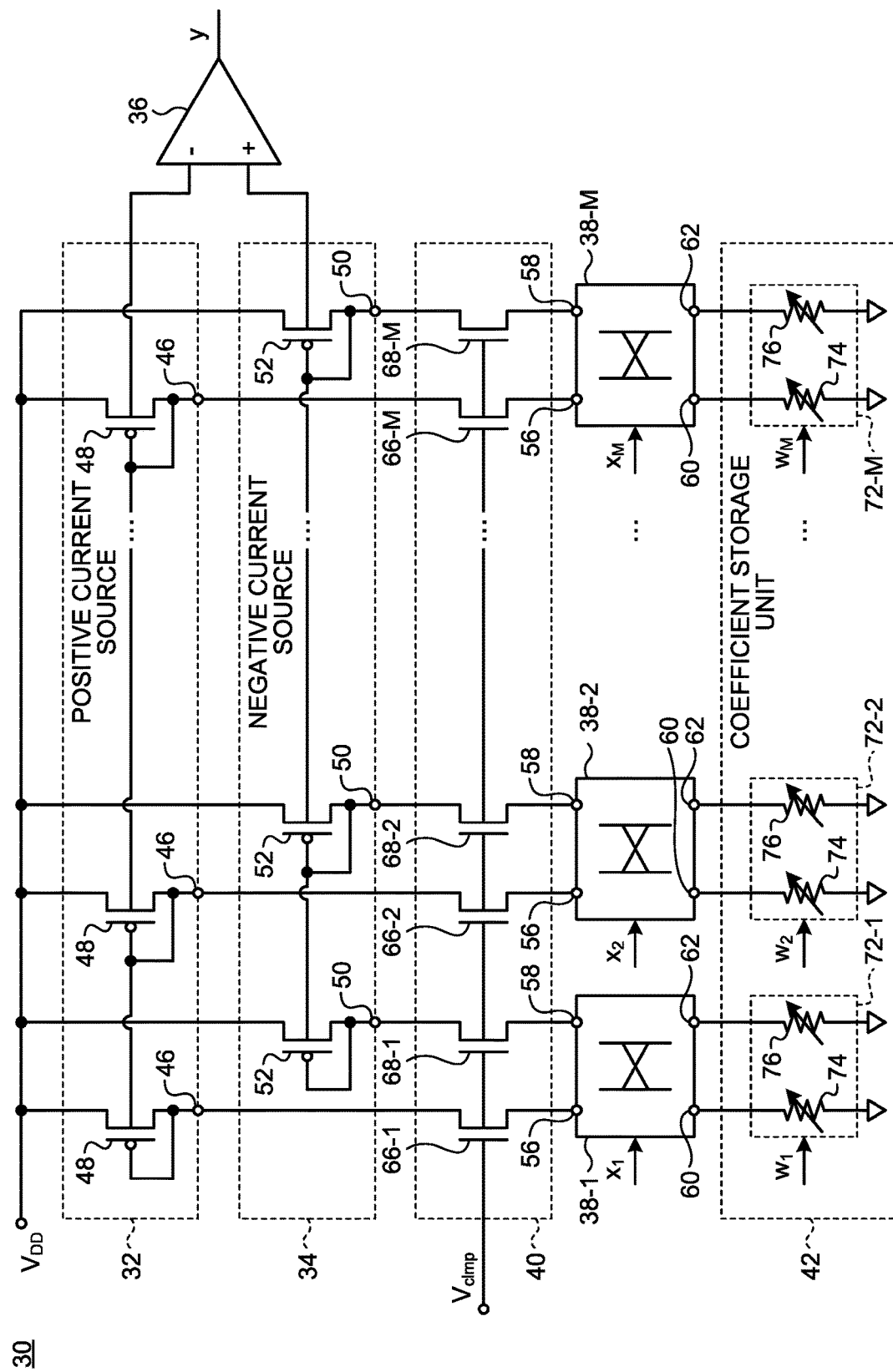
FIG. 4 is a diagram illustrating a circuit configuration of the product-sum operation circuit.

FIG. 4 is a diagram illustrating a circuit configuration of the product-sum operation circuit 30. According to the present embodiment, the product-sum operation circuit 30 of the reservoir circuit 12 and the inference circuit 14 can be realized by the conventional circuit.

For example, the product-sum operation circuit 30 which the reservoir circuit 12 includes is provided with a positive current source 32, a negative current source 34, a comparator 36, M cross switches 38, a clamping circuit 40, and a coefficient storage unit 42.

The positive current source 32 has a positive terminal 46. The positive current source 32 outputs current from the positive terminal 46. In addition, the positive current source 32 outputs a first voltage according to a value which is 1/D (D is an integer of 2 or more) of the current that is output from the positive terminal 46. For example, the positive current source 32 outputs a first voltage which is proportional to the value which is 1/D of the current that is output from the positive terminal 46. According to the present embodiment, D=M. However, D need not be the same as M. Note that, in FIG. 4, a plurality of positive terminals 46 are illustrated. However, the plurality of positive terminals 46 illustrated in FIG. 4 are electrically connected.

For example, the positive current source 32 has D first FETs 48. The D first FETs 48 are field effect transistors with the same characteristics. According to the present embodiment, the D first FETs 48 are pMOS transistors with the same characteristics.

The D first FETs 48 are connected to a common gate, have their respective sources connected to a second reference potential, and their respective drains connected to the gate and the positive terminals 46. The second reference potential is a positive power-supply voltage ($V_{DD}$), for example. In other words, the D first FETs 48 are each diode-connected, have their source connected to the second reference potential ($V_{DD}$, for example), and their gate and their drain connected to the positive terminals 46. Furthermore, the positive current source 32 outputs the voltages of the positive terminals 46 (the voltages of the gates of the first FETs 48) as a first voltage.

The negative current source 34 has a negative terminal 50. The negative current source 34 outputs current from the negative terminal 50. In addition, the negative current source 34 outputs a second voltage according to a value which is 1/D of the current that is output from the negative terminal 50. For example, the negative current source 34 outputs a second voltage which is proportional to the value which is 1/D of the current that is output from the negative terminal 50. Note that, in FIG. 4, a plurality of negative terminals 50 are illustrated. However, the plurality of negative terminals 50 illustrated in FIG. 4 are electrically connected.

For example, the negative current source 34 has D second FETs 52. The D second FETs 52 are field effect transistors with the same characteristics as the first FETs 48. According to the present embodiment, the D second FETs 52 are pMOS transistors with the same characteristics as the first FETs 48.

The D second FETs 52 are connected to a common gate, have their respective sources connected to a second reference potential, and their respective drains connected to the gate and the negative terminals 50. In other words, the D second FETs 52 are each diode-connected, have their source connected to the second reference potential ($V_{DD}$, for example), and their gate and their drain connected to the negative terminals 50. Furthermore, the negative current source 34 outputs the voltages of the negative terminals 50 (the voltages of the gates of the second FETs 52) as a second voltage.

The comparator 36 compares the sizes of the first voltage that is output from the positive current source 32 and the second voltage that is output from the negative current source 34. The comparator 36 then outputs an intermediate signal (y) which has a value according to the result of the comparison between the first voltage and the second voltage. If the first voltage is smaller than the second voltage, the comparator 36 outputs an intermediate signal of a first logical value (for example, −1), and if the first voltage is equal to or larger than the second voltage, the comparator 36 outputs an intermediate signal of a second logical value (for example, +1). Note that, if the first voltage is smaller than the second voltage, the comparator 36 may also output an intermediate signal of a second logical value (for example, +1), and if the first voltage is equal to or larger than the second voltage, the comparator 36 may output an intermediate signal of a first logical value (for example, −1).

The M cross switches 38 are each provided so as to correspond to the respective M input signals. According to the present embodiment, the product-sum operation circuit 30 includes, as the M cross switches 38, first to Mth cross switches 38-1 to 38-M. For example, the first cross switch 38-1 corresponds to the first input signal ($x_1$), the second cross switch 38-2 corresponds to the second input signal ($x_2$), and the Mth cross switch 38-M corresponds to the Mth input signal ($x_M$).

The M cross switches 38 each have a positive current input terminal 56, a negative current input terminal 58, a first terminal 60, and a second terminal 62.

The M cross switches 38 each connect the first terminal 60 to either the positive current input terminal 56 or the negative current input terminal 58. Furthermore, the M cross switches 38 each connect the second terminal 62 to the other one of the positive current input terminal 56 and the negative current input terminal 58 to which the first terminal 60 is not connected. The M cross switches 38 each switch connections of the first terminal 60 and the second terminal 62 to either the positive current input terminal 56 or the negative current input terminal 58 according to the value of the corresponding input signal.

The clamping circuit 40 has M positive FET switches 66 which correspond to the respective M cross switches 38. According to the present embodiment, the clamping circuit 40 has, as the M positive FET switches 66, first to Mth positive FET switches 66-1 to 66-M. For example, the first positive FET switch 66-1 corresponds to the first cross switch 38-1, the second positive FET switch 66-2 corresponds to the second cross switch 38-2, and the Mth positive FET switch 66-M corresponds to the Mth cross switch 38-M.

The M positive FET switches 66 each have their gate connected to a clamping potential ($V_{clmp}$), have their source connected to the positive terminal 46, and their drain connected to the positive current input terminal 56 of the corresponding cross switch 38. The M positive FET switches 66 are each ON across the source and drain during operation of the product-sum operation circuit 30. Thus, the respective positive current input terminals 56 of the M cross switches 38 are connected to the positive terminals 46 of the positive current sources 32 and have a voltage fixed at the clamping potential ($V_{clmp}$), during operation of the product-sum operation circuit 30.

In addition, the clamping circuit 40 has M negative FET switches 68 which correspond to the respective M cross switches 38. According to the present embodiment, the clamping circuit 40 has, as the M negative FET switches 68, first to Mth negative FET switches 68-1 to 68-M. For example, the first negative FET switch 68-1 corresponds to the first cross switch 38-1, the second negative FET switch 68-2 corresponds to the second cross switch 38-2, and the Mth negative FET switch 68-M corresponds to the Mth cross switch 38-M.

The M negative FET switches 68 each have their gate connected to the clamping potential ($V_{clmp}$), have their source connected to the negative terminal 50, and their drain connected to the negative current input terminal 58 of the corresponding cross switch 38. The M negative FET switches 68 are each ON across the source and drain during operation of the product-sum operation circuit 30. Thus, the respective negative current input terminals 58 of the M cross switches 38 are connected to the negative terminals 50 of the negative current sources 34 and have a voltage fixed at the clamping potential ($V_{clmp}$), during operation of the product-sum operation circuit 30.

The coefficient storage unit 42 has M cells 72 that correspond to the respective M coefficients. According to the present embodiment, the coefficient storage unit 42 has, as the M cells 72, first to Mth cells 72-1 to 72-M. For example, the first cell 72-1 corresponds to the first coefficient ($w_1$), the second cell 72-2 corresponds to the second coefficient ($w_2$), and the Mth cell 72-M corresponds to the Mth coefficient ($w_M$). Note that the first coefficient ($w_1$) corresponds to the first input signal ($x_1$), the second coefficient ($w_2$) corresponds to the second input signal ($x_2$), and the Mth coefficient ($w_M$) corresponds to the Mth input signal ($x_M$). Thus, for example, the first cell 72-1 corresponds to the first cross switch 38-1, the second cell 72-2 corresponds to the second cross switch 38-2, and the Mth cell 72-M corresponds to the Mth cross switch 38-M.

The M cells 72 each include a first resistance 74 and a second resistance 76. One terminal of the first resistance 74 is connected to the first terminal 60 of the corresponding cross switch 38, and the other terminal is connected to the first reference potential. The first reference potential is ground, for example. One terminal of the second resistance 76 is connected to the second terminal 62 of the corresponding cross switch 38, and the other terminal is connected to the first reference potential.

The first resistance 74 and/or the second resistance 76 is a variable resistance such as a variable resistance memory, for example. The size relationship between the resistance values of the first resistance 74 and second resistance 76 may be switched according to the corresponding coefficient values. For example, the control circuit 16 configures, prior to receiving the M input signals, the size relationships between the resistance values of the first resistance 74 and second resistance 76 contained in the corresponding cells 72 according to the respective M coefficients.

For example, if the corresponding coefficient is +1, the plurality of cells 72 each have their first resistance 74 that is set to a first resistance value and their second resistance 76 set to a second resistance value different from the first resistance value. Furthermore, if the corresponding coefficient is −1, the plurality of cells 72 each have their first resistance 74 set to the second resistance value and their second resistance 76 set to the first resistance value.

In addition, the first resistance 74 or second resistance 76 of each of the plurality of cells 72 is a fixed resistance, while the other one of the first resistance 74 and second resistance 76 is a variable resistance. In this case, when the corresponding coefficient is +1, and −1, for each of the plurality of cells 72, the resistance value of the variable resistance is changed so that the polarity of the resistance difference between the first resistance 74 and second resistance 76 is reversed.

Furthermore, the M cross switches 38 each switch, according to the value of the corresponding input signal, the first terminal 60 and second terminal 62 between either a straight connection or a reverse connection with respect to the positive terminal 46 (positive current input terminal 56) and the negative terminal 50 (negative current input terminal 58).

For example, in the case of a straight connection, the respective M cross switches 38 connect the first terminal 60 to the positive terminal 46 (positive current input terminal 56), and connect the second terminal 62 to the negative terminal 50 (negative current input terminal 58). In addition, in the case of a reverse connection, the respective M cross switches 38 connect the first terminal 60 to the negative terminal 50 (negative current input terminal 58), and connect the second terminal 62 to the positive terminal 46 (positive current input terminal 56).

For example, if the value of the corresponding input signal is +1, the respective M cross switches 38 establish a straight connection and establish a reverse connection if the value of the corresponding input signal is −1. In contrast, if the value of the corresponding input signal is +1, the respective M cross switches 38 may establish a reverse connection and may establish a straight connection if the value of the corresponding input signal is −1.

Figure 5:
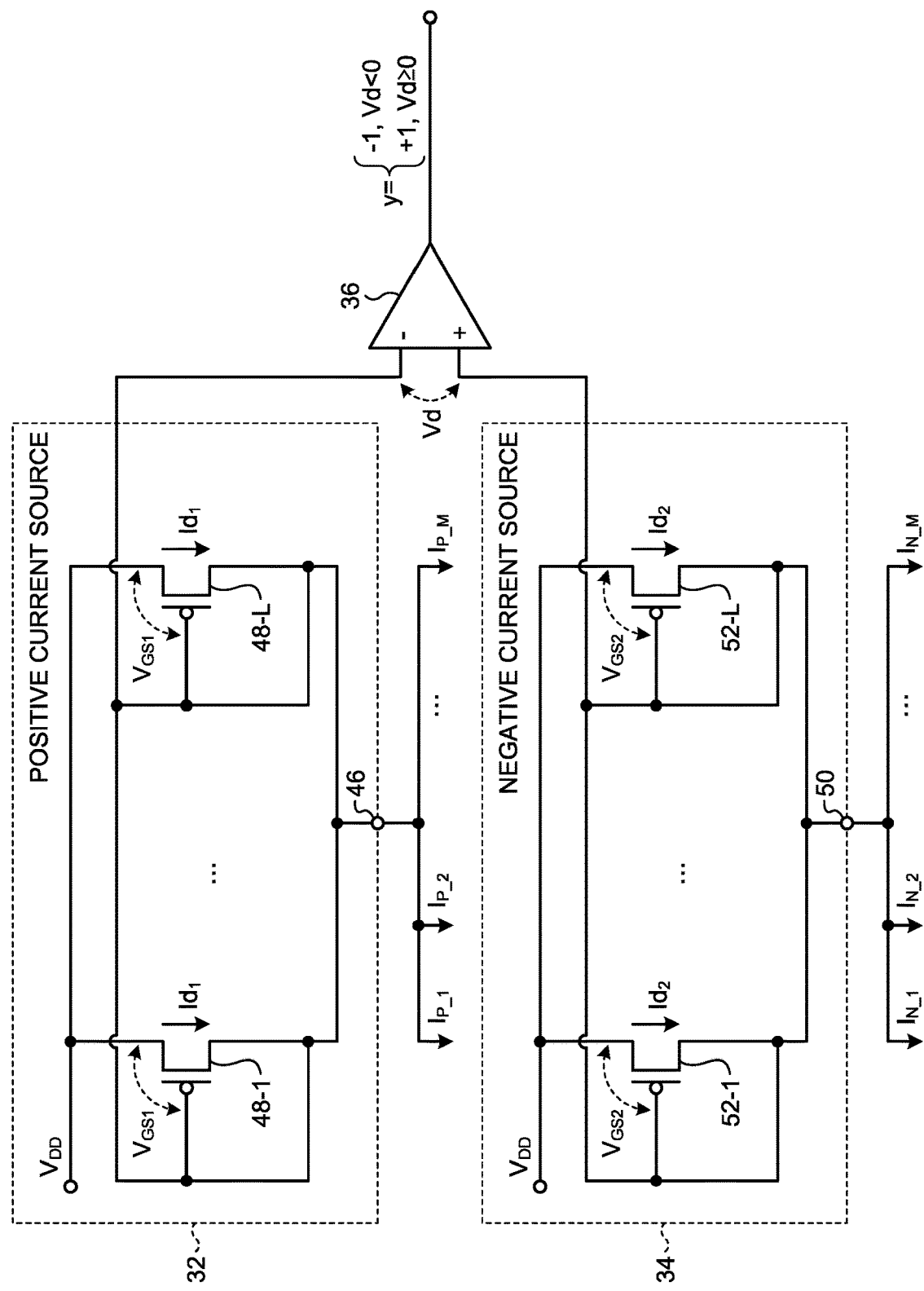
FIG. 5 is a diagram to describe operations of a positive current source, a negative current source, and a comparator.

FIG. 5 is a diagram to describe operations of a positive current source 32, a negative current source 34, and a comparator 36.

The positive current source 32 outputs a current $I_{P\_1}$ to the first cell 72-1. In addition, the positive current source 32 outputs a current $I_{P\_2}$ to the second cell 72-2. Further, the positive current source 32 outputs a current $I_{P\_M}$ to the Mth cell 72-M. Thus, the positive current source 32 outputs a current $I_{P\_1}+I_{P\_2}+\ldots+I_{P\_M}$ from the positive terminal 46.

In addition, the positive current source 32 has D first FETs 48. The D first FETs 48 have the same characteristics and the same connection relationships. Thus, the D first FETs 48 pass the same drain current ($Id_1$).

Furthermore, the sum total of the drain currents ($Id_1$) of the D first FETs 48 is $D \times Id_1$. The drain current ($Id_1$) of the D first FETs 48 is supplied to all the positive terminals 46. Therefore, $D \times Id_1 = (I_{P\_1}+I_{P\_2}+\ldots+I_{P\_M})$. In other words, the respective drain currents ($Id_1$) of the D first FETs 48 are $(I_{P\_1}+I_{P\_2}+\ldots+I_{P\_M})/D$.

The negative current source 34 outputs a current $I_{N\_1}$ to the first cell 72-1. In addition, the negative current source 34 outputs a current $I_{N\_2}$ to the second cell 72-2. Further, the negative current source 34 outputs a current $I_{N\_M}$ to the Mth cell 72-M. Thus, the negative current source 34 outputs a current $I_{N\_1}+I_{N\_2}+\ldots+I_{N\_M}$ from the negative terminal 50.

The negative current source 34 has D second FETs 52. The D second FETs 52 have the same characteristics and the same connection relationships. Thus, the D second FETs 52 pass the same drain current ($Id_2$).

Furthermore, the sum total of the drain currents ($Id_2$) of the D second FETs 52 is $D \times Id_2$. The drain current ($Id_2$) of the D second FETs 52 is supplied to all the negative terminals 50. Therefore, $D \times Id_2 = (I_{N\_1}+I_{N\_2}+\ldots+I_{N\_M})$. In other words, the respective drain currents ($Id_2$) of the D second FETs 52 are $(I_{N\_1}+I_{N\_2}+\ldots+I_{N\_M})/D$.

The positive current source 32 outputs, as a first voltage, a voltage which is generated at the positive terminal 46. The voltage generated at the positive terminal 46 is a potential obtained by subtracting the gate-source voltage ($V_{GS1}$) of the first FET 48 from the second reference potential (for example, $V_{DD}$).

Furthermore, the negative current source 34 outputs, as a second voltage, the voltage generated at the negative terminal 50. The voltage generated at the negative terminal 50 is a potential obtained by subtracting the gate-source voltage ($V_{GS2}$) of the second FET 52 from the second reference potential (for example, $V_{DD}$).

The comparator 36 determines whether or not the difference (Vd) between the first voltage and second voltage is less than zero or equal to or greater than zero. For example, if the difference (Vd) between the first voltage and second voltage is less than zero, the comparator 36 outputs a first logical value (for example, −1), and outputs a second logical value (for example, +1) if the difference (Vd) is equal to or greater than zero.

Here, the difference (Vd) between the first voltage and second voltage is equal to the voltage obtained by subtracting the gate-source voltage ($V_{GS2}$) of the second FET 52 from the gate-source voltage ($V_{GS1}$) of the first FET 48.

The gate-source voltage ($V_{GS1}$) of the first FET 48 is a value proportional to the drain current ($Id_1$) of the first FET 48. Furthermore, the gate-source voltage ($V_{GS2}$) of the second FET 52 is a value proportional to the drain current ($Id_2$) of the second FET 52. In addition, the first FET 48 and second FET 52 have the same characteristics. Thus, the difference (Vd) between the first voltage and second voltage is proportional to the current obtained by subtracting the drain current $((I_{N\_1}+I_{N\_2}+\ldots+I_{N\_M})/D)$ of the second FET 52 from the drain current $((I_{P\_1}+I_{P\_2}+\ldots+I_{P\_M})/D)$ of the first FET 48.

Based on the foregoing, the intermediate signal (y) indicates whether or not the current obtained by subtracting the drain current $((I_{N\_1}+I_{N\_2}+\ldots+I_{N\_M})/D)$ of the second FET 52 from the drain current $((I_{P\_1}+I_{P\_2}+\ldots+I_{P\_M})/D)$ of the first FET 48 is less than zero or equal to or greater than zero.

Here, the number (D) of first FETs 48 which the positive current source 32 includes is the same as the number (D) of second FETs 52 which the negative current source 34 includes. In addition, the comparator 36 inverts the value by using a threshold level of 0. The 0 crosspoint of the current obtained by subtracting the drain current $((I_{N\_1}+I_{N\_2}+\ldots+I_{N\_M})/D)$ of the second FET 52 from the drain current $(I_{P\_1}+I_{P\_2}+\ldots+I_{P\_M})/D)$ of the first FET 48 is the same as the 0 crosspoint of the current obtained by subtracting the total current $(I_{N\_1}+I_{N\_2}+\ldots+I_{N\_M})$ that is output from the negative terminal 50 from the total current $(I_{P\_1}+I_{P\_2}+\ldots+I_{P\_M})$ that is output from the positive terminal 46. Therefore, the intermediate signal (y) indicates whether or not the current obtained by subtracting the total current $(I_{N\_1}+I_{N\_2}+\ldots+I_{N\_M})$ that is output from the negative terminal 50 from the total current $(I_{P\_1}+I_{P\_2}+\ldots+I_{P\_M})$ that is output from the positive terminal 46 is less than zero or equal to or greater than zero.

The difference $(I_{P\_i}-I_{N\_i})$ between the current $(I_{P\_i})$ that is output from the positive terminal 46 to an ith cell 72-i and the current $(I_{N\_i})$ that is output from the negative terminal 50 to the ith cell 72-i represents a value $(w_i \cdot x_i)$ obtained by multiplying the ith coefficient $(w_i)$ by the ith input signal $(x_i)$. Further, the current obtained by subtracting the total current $(I_{N\_1}+I_{N\_2}+\ldots+I_{N\_M})$ that is output from the negative terminal 50 from the total current $(I_{P\_1}+I_{P\_2}+\ldots+I_{P\_M})$ that is output from the positive terminal 46 represents a product-sum operation (multiplication/accumulation) value of M input signals and M coefficients.

Therefore, the intermediate signal (y) indicates whether or not the product-sum operation value (multiplication/accumulation value) of M input signals and M coefficients is less than zero or equal to or greater than zero.

Thus, the product-sum operation circuit 30 is capable of executing a product-sum operation (multiplication/accumulation) of M coefficients by analog processing. Further, the product-sum operation circuit 30 is capable of generating an intermediate signal by performing code function processing with respect to the signal corresponding to the product-sum operation value.

Note that FIGS. 4 and 5 illustrate the reference signs of the product-sum operation circuit 30 which the reservoir circuit 12 includes but the product-sum operation circuit 30 which the inference circuit 14 includes also has substantially the same configuration.

However, the product-sum operation circuit 30 which the inference circuit 14 includes receives N intermediate signals (y). The comparator 36 outputs an output signal (z) instead of the intermediate signal (y). The product-sum operation circuit 30 which the inference circuit 14 includes has N cross switches 38 instead of M cross switches 38. The N cross switches 38 are each provided so as to correspond to the respective N intermediate signals. The coefficient storage unit 42 has N cells 72 that correspond to the N coefficients instead of the M cells 72.

Figure 6:
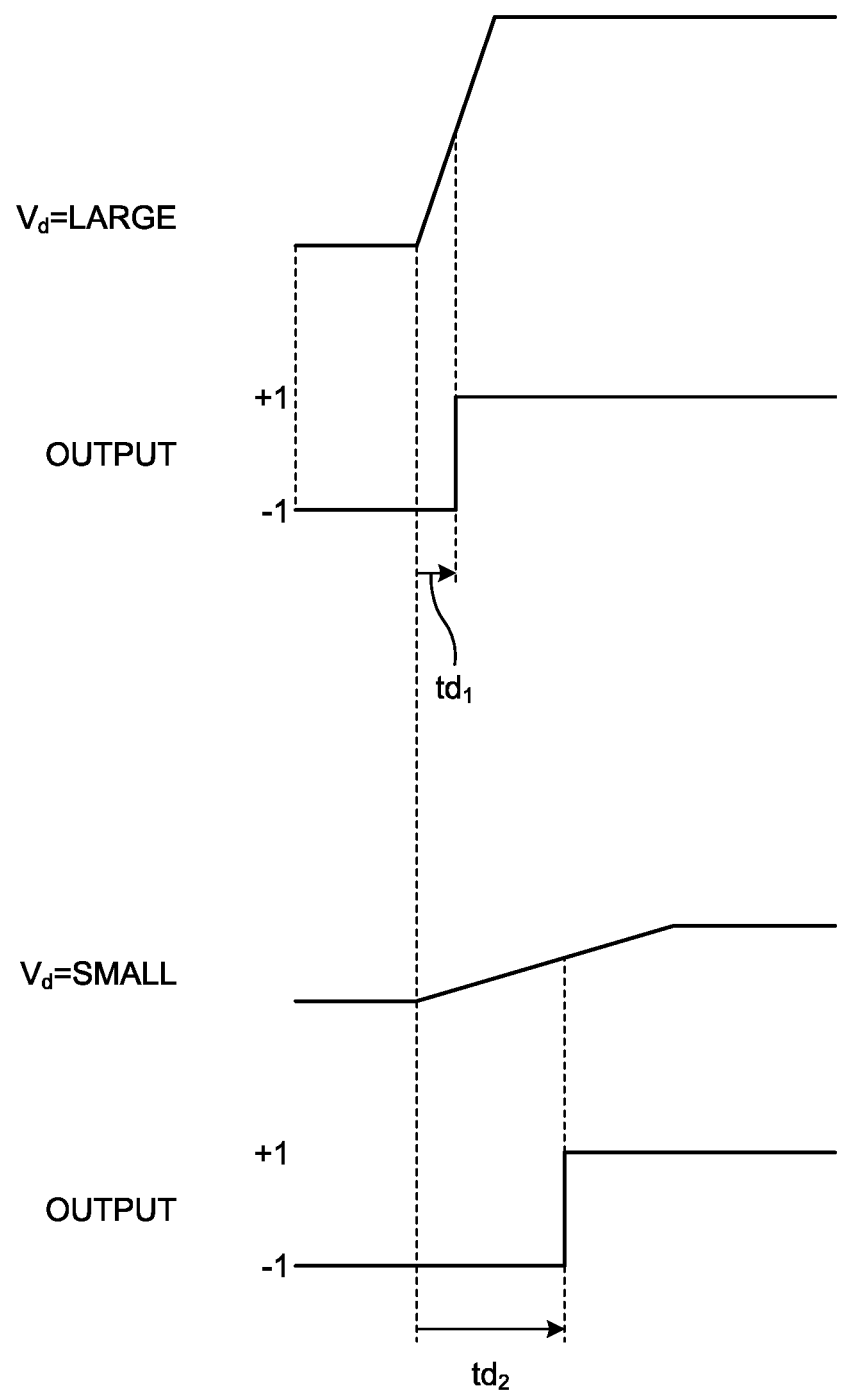
FIG. 6 is a diagram to describe delaying of an output of the comparator.

FIG. 6 is a diagram to describe delaying of an output of the comparator 36.

The N product-sum operation circuits 30 which the reservoir circuit 12 includes each include the comparator 36, which receives a voltage according to the value obtained by performing a product-sum operation with respect to the M input signals and the set M coefficients, binarizes the received voltage, and outputs a binarized signal as the corresponding intermediate signal among the N intermediate signals. Furthermore, the L product-sum operation circuits 30 which the inference circuit 14 includes each include the comparator 36, which receives a voltage according to the value obtained by performing a product-sum operation with respect to the N intermediate signals and the set N coefficients, binarizes the received voltage, and outputs a binarized signal as the corresponding output signal among the L output signals.

Here, if the output is inverted from the first logical value (for example, −1) to the second logical value (for example, +1), the larger the applied voltage (the difference (Vd) between the first voltage and the second voltage) is, the higher the speed at which the comparator 36 operates. In other words, a response delay amount ($td_2$) if the voltage applied to the comparator 36 is small (Vd=small) is greater than a response delay amount ($td_1$) if the applied voltage is large (Vd=large).

The voltage (Vd) applied to the comparator 36 increases as the total value of the set coefficient values increases. Thus, the larger the total value of the set coefficient values of the product-sum operation circuit 30, the smaller the response delay amount. In other words, the larger the total value of the set coefficient values of the product-sum operation circuit 30, the smaller the delay amount until a signal is fired.

Conversely, the smaller the total value of the set coefficient values of the product-sum operation circuit 30, the larger the response delay amount. In other words, the smaller the total value of the set coefficient values of the product-sum operation circuit 30, the larger the delay amount until a signal is fired.

Thus, by adjusting the plurality of coefficients set to the plurality of product-sum operation circuits 30 which the reservoir circuit 12 includes, the control circuit 16 is capable of adjusting the delay amount until the N intermediate signals are fired. Similarly, by adjusting the plurality of coefficients set to the plurality of product-sum operation circuits 30 which the inference circuit 14 includes, the control circuit 16 is capable of adjusting the delay amount until the L output signals are fired.

Figure 7:
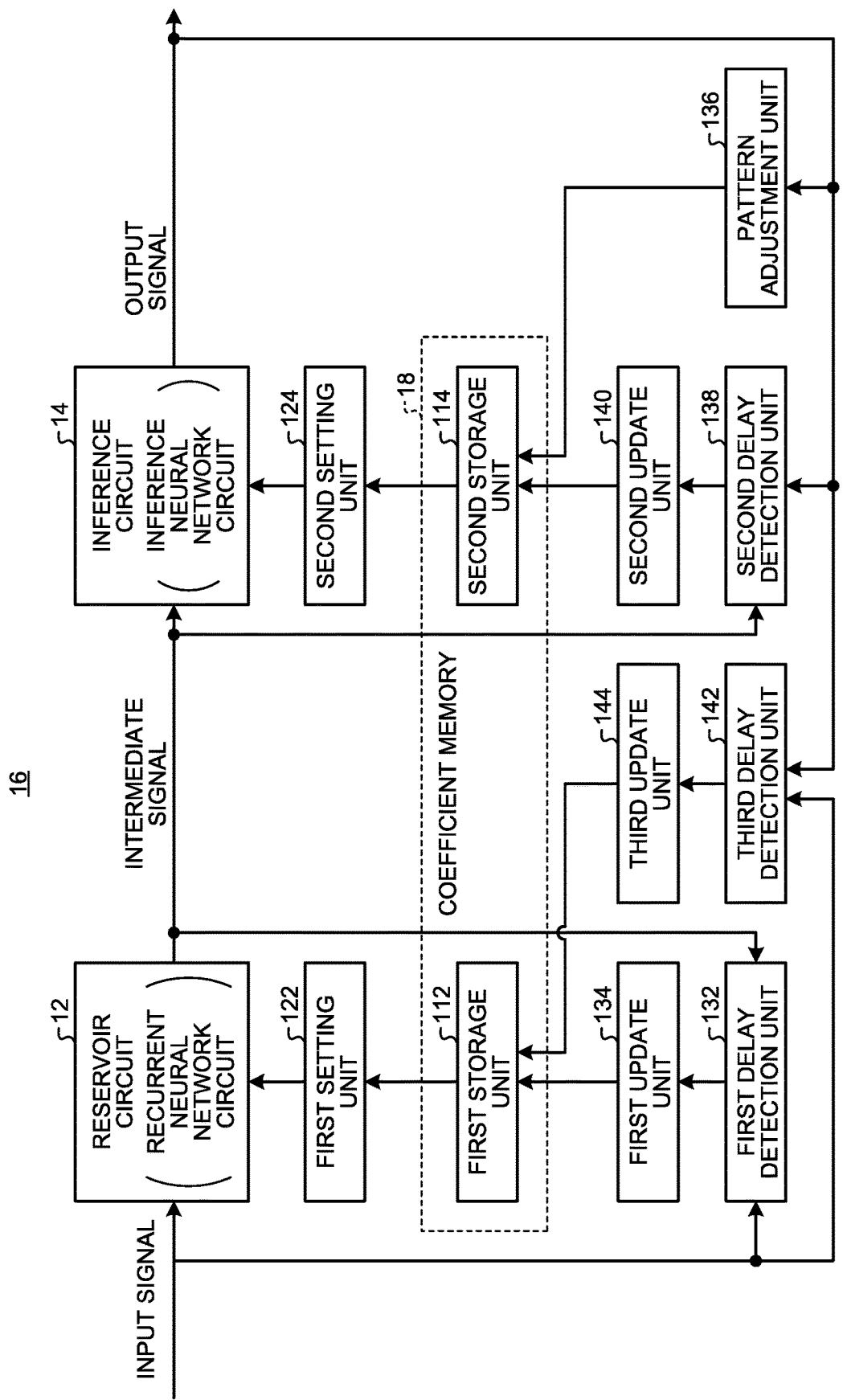

FIG. 7 is a diagram illustrating the functional configuration of the control circuit 16 together with the reservoir circuit 12, the inference circuit 14, and the coefficient memory 18.

The coefficient memory 18 includes a first storage unit 112 and a second storage unit 114. The control circuit 16 includes a first setting unit 122, a second setting unit 124, a first delay detection unit 132, a first update unit 134, a pattern adjustment unit 136, a second delay detection unit 138, a second update unit 140, a third delay detection unit 142, and a third update unit 144.

The first storage unit 112 stores a plurality of digital coefficient values for which there is one-to-one correspondence with the plurality of coefficients set to the reservoir circuit 12. The first setting unit 122 changes the plurality of coefficients set to the reservoir circuit 12 on the basis of the plurality of digital coefficient values stored in the first storage unit 112.

The second storage unit 114 stores a plurality of digital coefficient values for which there is one-to-one correspondence with the plurality of coefficients set to the inference circuit 14. The second setting unit 124 changes the plurality of coefficients set to the inference circuit 14 on the basis of the plurality of digital coefficient values stored in the second storage unit 114.

The respective pluralities of coefficients set to the reservoir circuit 12 and the inference circuit 14 are represented by a first gradation number. According to the present embodiment, the respective pluralities of coefficients set to the reservoir circuit 12 and the inference circuit 14 are represented by binary values. In addition, the respective pluralities of digital coefficient values stored in the first storage unit 112 and the second storage unit 114 are each represented by a second gradation number which is greater than the first gradation number. For example, the respective pluralities of digital coefficient values stored in the first storage unit 112 and the second storage unit 114 are represented by eight bits. The first setting unit 122 transforms each of the plurality of digital coefficient values stored in the first storage unit 112 to the first gradation number, and on the basis of the plurality of digital coefficient values represented by the first gradation number, changes the plurality of coefficients set to the reservoir circuit 12. The second setting unit 124 transforms each of the plurality of digital coefficient values stored in the second storage unit 114 to the first gradation number, and on the basis of the plurality of digital coefficient values represented by the first gradation number, changes the plurality of coefficients set to the inference circuit 14.

The first delay detection unit 132 detects a first delay time period at the time of learning. The first delay time period is a time period extending from the timing for applying the M input signals to the reservoir circuit 12 until the timing for firing the N intermediate signals. It is assumed, for example, that an ith (i is an integer of 1 or more and M or less) input signal among the M input signals is applied to the reservoir circuit 12, and that the reservoir circuit 12 causes a jth (j is an integer of 1 or more and N or less) intermediate signal among the N intermediate signals to be fired. In this case, the application timing is timing at which the ith input signal among the M input signals is applied to the reservoir circuit 12. Furthermore, here, the firing timing is timing, after the application timing, at which the jth intermediate signal among the N intermediate signals is initially fired. In other words, in this case, the first delay time period is a time period extending from the timing for applying the ith input signal until the timing for initially firing the jth intermediate signal.

The first update unit 134 adjusts the plurality of coefficients set to the reservoir circuit 12 according to the first delay time period, at the time of learning. More specifically, the first update unit 134 adjusts the plurality of coefficients set to the reservoir circuit 12 so that the first delay time period is long.

For example, if an ith input signal among the M input signals is applied to the reservoir circuit 12 and the reservoir circuit 12 causes a jth intermediate signal among the N intermediate signals to be fired, the first update unit 134 adjusts, according to the first delay time period, the relative relationship between a target coefficient among the plurality of coefficients set to the reservoir circuit 12 and a coefficient group other than the target coefficient among the plurality of coefficients set to the reservoir circuit 12. The target coefficient is a coefficient that is multiplied by the ith input signal among the M coefficients set to the product-sum operation circuit 30 that outputs the jth intermediate signal among the N product-sum operation circuits 30 which the reservoir circuit 12 includes.

For example, if the first delay time period is shorter than a preset threshold value, the first update unit 134 may also relatively reduce the target coefficient and relatively increase (i.e. performs relative increasing with respect to) the coefficient group other than the target coefficient. In addition, for example, as the first delay time period shortens, the first update unit 134 may increase the relative reduction amount of the target coefficient and increase the relative increase amount of the coefficient group other than the target coefficient. Accordingly, the first update unit 134 is capable of adjusting the plurality of coefficients set to the reservoir circuit 12 so that the first delay time period is long.

Note that, if the plurality of coefficients set to the reservoir circuit 12 is adjusted, the first update unit 134 adjusts the plurality of digital coefficient values stored in the first storage unit 112. If the plurality of digital coefficient values are adjusted by the first update unit 134, the first setting unit 122 changes the plurality of coefficients set to the reservoir circuit 12 on the basis of the adjusted plurality of digital coefficient values.

The pattern adjustment unit 136 supplies M input signals according to training data to the reservoir circuit 12 at the time of supervised learning. The pattern adjustment unit 136 acquires firing patterns of L output signals if M input signals according to training data are supplied to the reservoir circuit 12 at the time of supervised learning. If M input signals according to training data are supplied to the reservoir circuit 12, the pattern adjustment unit 136 then adjusts the plurality of coefficients set to the inference circuit 14 so that an output signal, indicated in teaching data corresponding to the training data among the L output signals, is fired.

Note that, if the plurality of coefficients set to the inference circuit 14 are adjusted, the pattern adjustment unit 136 adjusts the plurality of digital coefficient values stored in the second storage unit 114. If the plurality of digital coefficient values are adjusted by the pattern adjustment unit 136, the second setting unit 124 changes the plurality of coefficients set to the inference circuit 14 on the basis of the adjusted plurality of digital coefficient values.

The second delay detection unit 138 detects a second delay time period at the time of supervised learning. The second delay time period is a time period extending from the timing for applying, to the reservoir circuit 12, the M input signals according to the training data at the time of supervised learning until the timing for firing the kth (k is an integer of 1 or more and L or less) output signal indicated in teaching data corresponding to the training data among the L output signals. In addition, the second delay time period may also be a time period extending from the timing for applying, to the inference circuit 14, the N intermediate signals in a case where the M input signals according to the training data are applied to the reservoir circuit 12, until the timing for firing the kth output signal indicated in the teaching data corresponding to the training data among the L output signals.

The second update unit 140 adjusts the plurality of coefficients set to the inference circuit 14 according to the second delay time period. More specifically, the second update unit 140 adjusts the plurality of coefficients set to the inference circuit 14 so that the second delay time period is short.

For example, if the M input signals according to the training data are applied to the reservoir circuit 12 and the inference circuit 14 causes the kth output signal indicated in the teaching data among the L output signals to fire, the second update unit 140 adjusts, according to the second delay time period, the relative relationship between an output coefficient group among the plurality of coefficients set to the inference circuit 14 and a coefficient group other than the output coefficient group among the plurality of coefficients set to the inference circuit 14. The output coefficient group is N coefficients that are set to the product-sum operation circuit 30 that outputs the kth output signal among the L product-sum operation circuits 30 included in the inference circuit 14.

For example, if the second delay time period is longer than a preset threshold value, the second update unit 140 may relatively increase the output coefficient group and relatively reduce the coefficient group other than the output coefficient group. Furthermore, as the second delay time period becomes longer, the second update unit 140 may increase the relative increase amount of the output coefficient group and increase the relative reduction amount of the coefficient group other than the output coefficient group. Accordingly, the second update unit 140 is capable of adjusting the plurality of coefficients set to the inference circuit 14 so that the second delay time period is short.

Note that, if the plurality of coefficients set to the inference circuit 14 is adjusted, the second update unit 140 adjusts the plurality of digital coefficient values stored in the second storage unit 114. If the plurality of digital coefficient values are adjusted by the second update unit 140, the second setting unit 124 changes the plurality of coefficients set to the inference circuit 14 on the basis of the adjusted plurality of digital coefficient values.

The third delay detection unit 142 detects the total delay time period at the time of learning. The total delay time period is a time period extending from the timing for applying M input signals to the reservoir circuit 12 until the timing for firing L output signals. It is assumed, for example, that the ith input signal among the M input signals is applied to the reservoir circuit 12, and that the inference circuit 14 causes any output signal among the L output signals to be fired. In this case, the total delay time period is a time period extending from the timing for applying the ith input signal among the M input signals until the timing for firing any output signal among the L output signals.

The third update unit 144 adjusts the plurality of coefficients set to the reservoir circuit 12 according to the total delay time period, at the time of learning. More specifically, the third update unit 144 adjusts the plurality of coefficients set to the reservoir circuit 12 so that the total delay time period is short.

For example, if an ith input signal among the M input signals is applied to the reservoir circuit 12 and the inference circuit 14 causes any output signal among the L output signals to be fired, the third update unit 144 adjusts, according to a total delay time period, the relative relationship between an input coefficient group among the plurality of coefficients set to the reservoir circuit 12 and a coefficient group other than the input coefficient group among the plurality of coefficients set to the reservoir circuit 12. The input coefficient group is a coefficient group multiplied by the ith input signal among the plurality of coefficients set to the reservoir circuit 12.

For example, if the total delay time period is longer than a preset threshold value, the third update unit 144 may relatively increase the input coefficient group and relatively reduce the coefficient group other than the input coefficient group. Furthermore, as the total delay time period becomes longer, the third update unit 144 may increase the relative increase amount of the input coefficient group and increase the relative reduction amount of the coefficient group other than the input coefficient group. Accordingly, the third update unit 144 is capable of adjusting the plurality of coefficients set to the reservoir circuit 12 so that the total delay time period is short.

Note that, if the plurality of coefficients set to the reservoir circuit 12 is adjusted, the third update unit 144 adjusts the plurality of digital coefficient values stored in the first storage unit 112. If the plurality of digital coefficient values are adjusted by the third update unit 144, the first setting unit 122 changes the plurality of coefficients set to the reservoir circuit 12 on the basis of the adjusted plurality of digital coefficient values.

Figure 8:
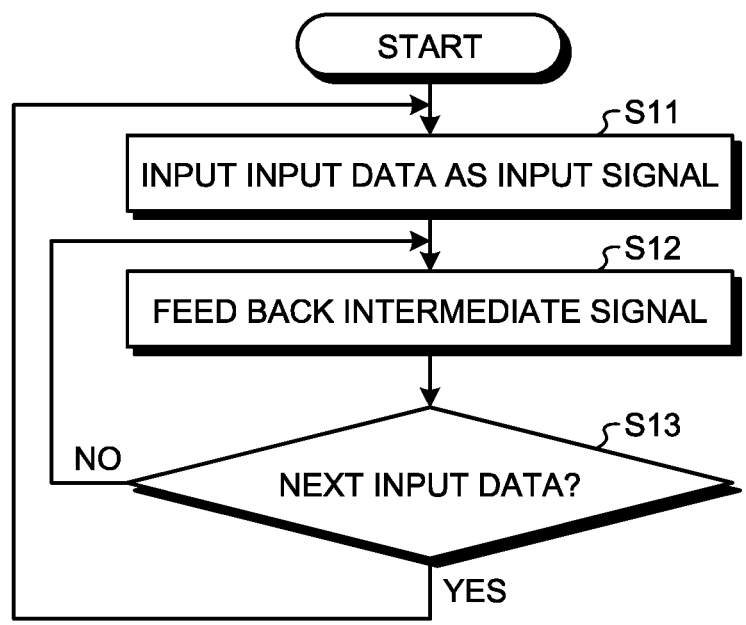
FIG. 8 is a flowchart illustrating the flow of processing by a switching circuit.

FIG. 8 is a flowchart illustrating the flow of processing by the switching circuit 24. The switching circuit 24 which the reservoir circuit 12 includes executes the processing in the flow illustrated in FIG. 8.

First, in S11, upon receiving input data from the earlier-stage data processing device, the switching circuit 24 supplies, to the first operation circuit 22, M input signals according to the input data. Thereafter, in S12, the switching circuit 24 feeds back the N intermediate signals that are output from the first operation circuit 22 and supplies the N intermediate signals to the first operation circuit 22 as M input signals.

Subsequently, in S13, the switching circuit 24 determines whether or not the next input data has been received from the earlier-stage data processing device. If the next input data has not been received from the earlier-stage data processing device (No in S13), the switching circuit 24 returns the processing to S12 and supplies the N intermediate signals to the first operation circuit 22 as M input signals.

If the next input data has been received from the earlier-stage data processing device (Yes in S13), the switching circuit 24 returns the processing to S11 and supplies, to the first operation circuit 22, the M input signals according to the next input data. The switching circuit 24 then repeats the processing from S11 to S13.

Figure 9:
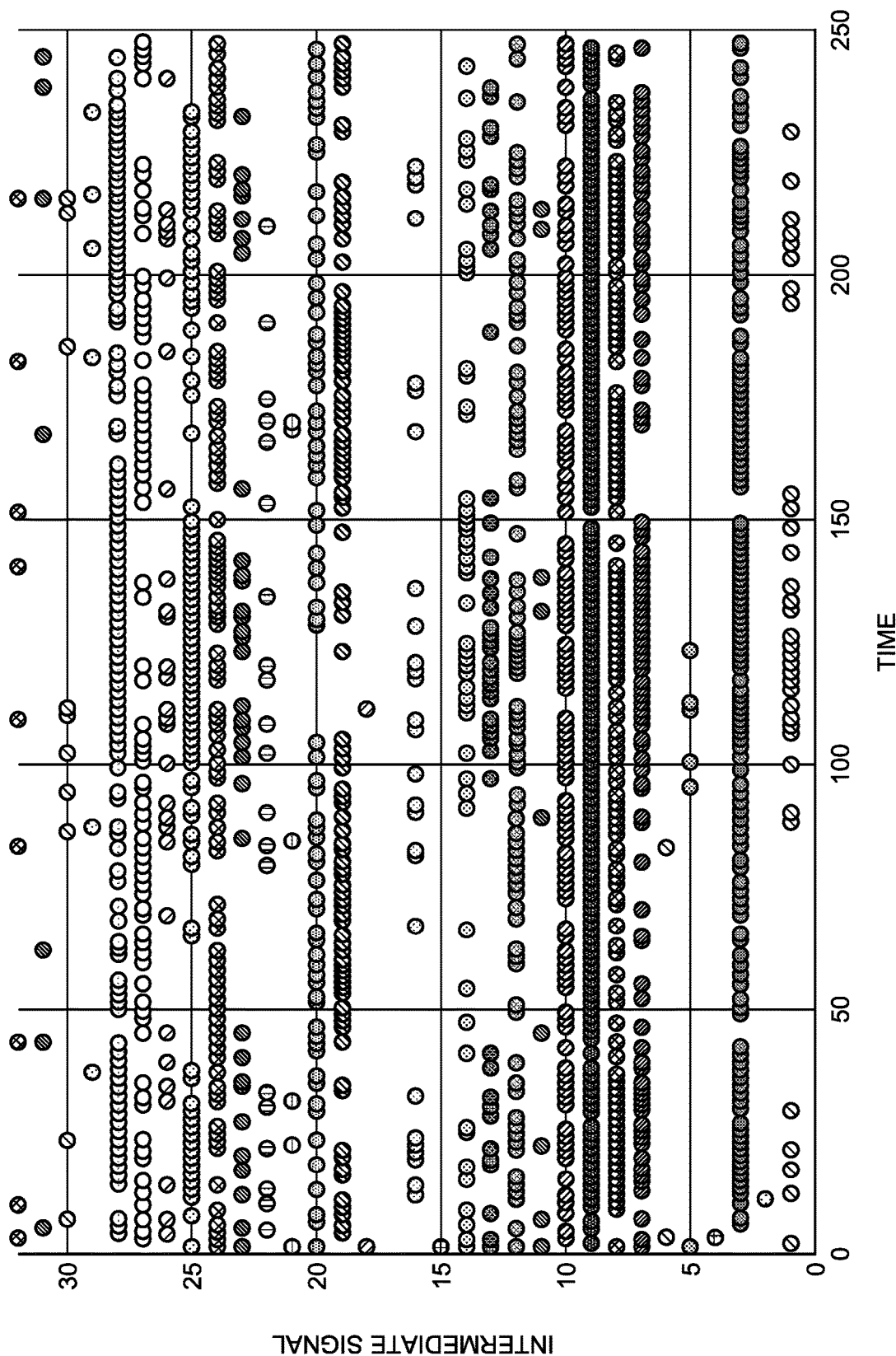
FIG. 9 is a diagram illustrating timing for firing N intermediate signals that are output from the reservoir circuit.

FIG. 9 is a diagram illustrating the timing for firing the N intermediate signals that are output from the reservoir circuit 12. In FIG. 9, identification numbers of thirty-two intermediate signals are plotted on the vertical axis, and time is plotted on the horizontal axis. In FIG. 9, the positions indicated by the dots indicate the timing at which the intermediate signals are fired.

As a result of the switching circuit 24 performing the processing illustrated in FIG. 8, the reservoir circuit 12 is capable of outputting N intermediate signals such that one or a plurality of intermediate signals are fired repeatedly. Thus, the reservoir circuit 12 is capable of outputting N intermediate signals obtained by using nonlinear transformation to project the M input signals onto a high-dimension feature space.

Figure 10:
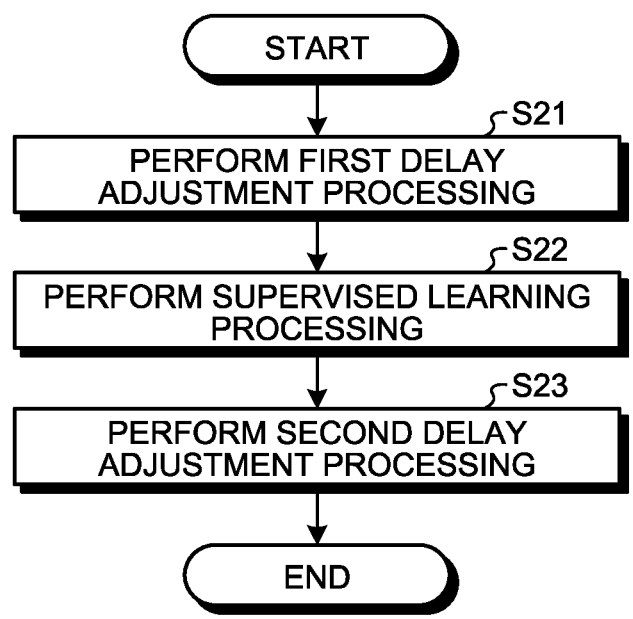
FIG. 10 is a flowchart illustrating the flow of processing during learning of the inference system.

FIG. 10 is a flowchart illustrating the flow of processing during learning of the inference system 10. The inference system 10 executes learning processing by the flow illustrated in FIG. 10. The inference system 10 may also execute learning processing prior to the inference processing or execute real-time learning processing in parallel with the inference processing.

First, in S21, the control circuit 16 executes the first delay adjustment processing. Accordingly, the control circuit 16 is capable of adjusting the plurality of coefficients set to the reservoir circuit 12 so that appropriate intermediate signals according to the task to be handled, the type of data, and the like, are output. Note that further details of the first delay adjustment processing will be provided subsequently with reference to FIGS. 11 and 12.

Thereafter, in S22, the control circuit 16 executes supervised learning processing. Accordingly, the control circuit 16 is capable of adjusting the plurality of coefficients set to the inference circuit 14 so that an appropriate inference result is obtained promptly. Note that further details of the supervised learning processing will be provided subsequently with reference to FIGS. 13, 14, 15 and 16.

Subsequently, in S23, the control circuit 16 executes the second delay adjustment processing. Accordingly, the control circuit 16 is capable of adjusting the plurality of coefficients set to the reservoir circuit 12 so that an inference result is output promptly. Note that further details of the second delay adjustment processing will be provided subsequently with reference to FIGS. 17 and 18.

By executing the foregoing processing, the inference system 10 is capable of suitably adjusting the plurality of coefficients set to the reservoir circuit 12 according to the task to be handled, the type of data, and the like. Further, the inference system 10 is capable of executing inference processing accurately and at high speed.

Figure 11:
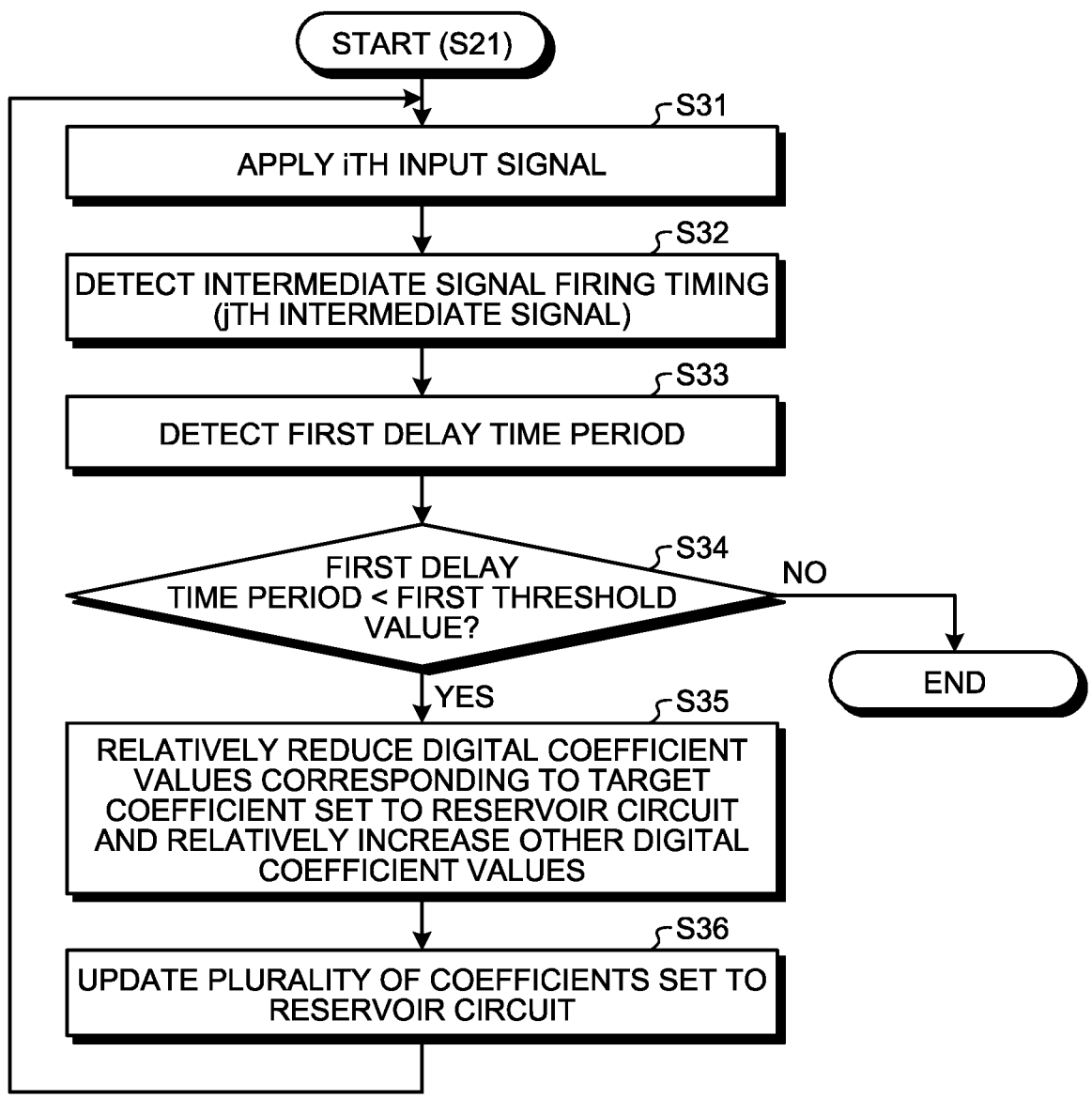
FIG. 11 is a flowchart illustrating the flow of first delay adjustment processing.

FIG. 11 is a flowchart illustrating the flow of first delay adjustment processing (S21). The control circuit 16 executes the processing illustrated in FIG. 11 in the first delay adjustment processing of S21.

First, in S31, the control circuit 16 applies an ith input signal to the reservoir circuit 12. For example, the control circuit 16 changes the ith input signal among the M input signals from the first logical value to the second logical value. Here, when the ith input signal is applied, the reservoir circuit 12 initially causes the jth intermediate signal among the N intermediate signals to be fired.

Subsequently, in S32, the control circuit 16 detects the timing for firing the intermediate signals. In this case, the control circuit 16 detects the timing for initially firing the jth intermediate signal after the application timing for applying the ith input signal.

Thereafter, in S33, the control circuit 16 detects the first delay time period. The first delay time period is a time period extending from the timing for applying the ith input signal until the timing for initially firing the jth intermediate signal.

Subsequently, in S34, the control circuit 16 determines whether or not the first delay time period is shorter than the preset first threshold value. If the first delay time period is equal to or larger than the first threshold value (No in S34), the control circuit 16 ends the processing of this flow. If the first delay time period is shorter than the first threshold value (Yes in S34), the control circuit 16 advances the processing to S35.

In S35, the control circuit 16 updates the plurality of digital coefficient values which correspond to the plurality of coefficients set to the reservoir circuit 12 and stored in the coefficient memory 18. More specifically, the control circuit 16 relatively reduces the digital coefficient values corresponding to the target coefficient and relatively increases the plurality of digital coefficient values corresponding to the coefficient group other than the target coefficient. The target coefficient is a coefficient that is multiplied by the ith input signal among the M coefficients set to the product-sum operation circuit 30 that outputs the jth intermediate signal among the N product-sum operation circuits 30 which the reservoir circuit 12 includes.

For example, the control circuit 16 may reduce the digital coefficient values corresponding to the target coefficient and does not necessarily change the plurality of digital coefficient values corresponding to the coefficient group other than the target coefficient. For example, the control circuit 16 does not necessarily change the digital coefficient values corresponding to the target coefficient and may increase the plurality of digital coefficient values corresponding to the coefficient group other than the target coefficient. For example, the control circuit 16 may reduce the digital coefficient values corresponding to the target coefficient and may increase the plurality of digital coefficient values corresponding to a portion of the coefficient group other than the target coefficient. In addition, as the first delay time period shortens, the control circuit 16 may increase the relative reduction amount of the digital coefficient values corresponding to the target coefficient and increase the relative increase amount of the plurality of digital coefficient values corresponding to the coefficient group other than the target coefficient.

Thereafter, in S36, the control circuit 16 updates a plurality of coefficients set to the reservoir circuit 12 on the basis of the plurality of digital coefficient values stored in the coefficient memory 18.

Upon finishing S36, the control circuit 16 returns the processing to S31 and repeats the processing from S31. The control circuit 16 repeats the processing from S31 to S36 until the first delay time period is equal to or greater than the first threshold value, or until a predetermined time period has elapsed or until loop processing equivalent to a predetermined number of loops is executed.

After finishing this flow, the control circuit 16 may repeat this flow again by changing the input signals applied. For example, the control circuit 16 may execute this flow for all the N input signals.

Figure 12:
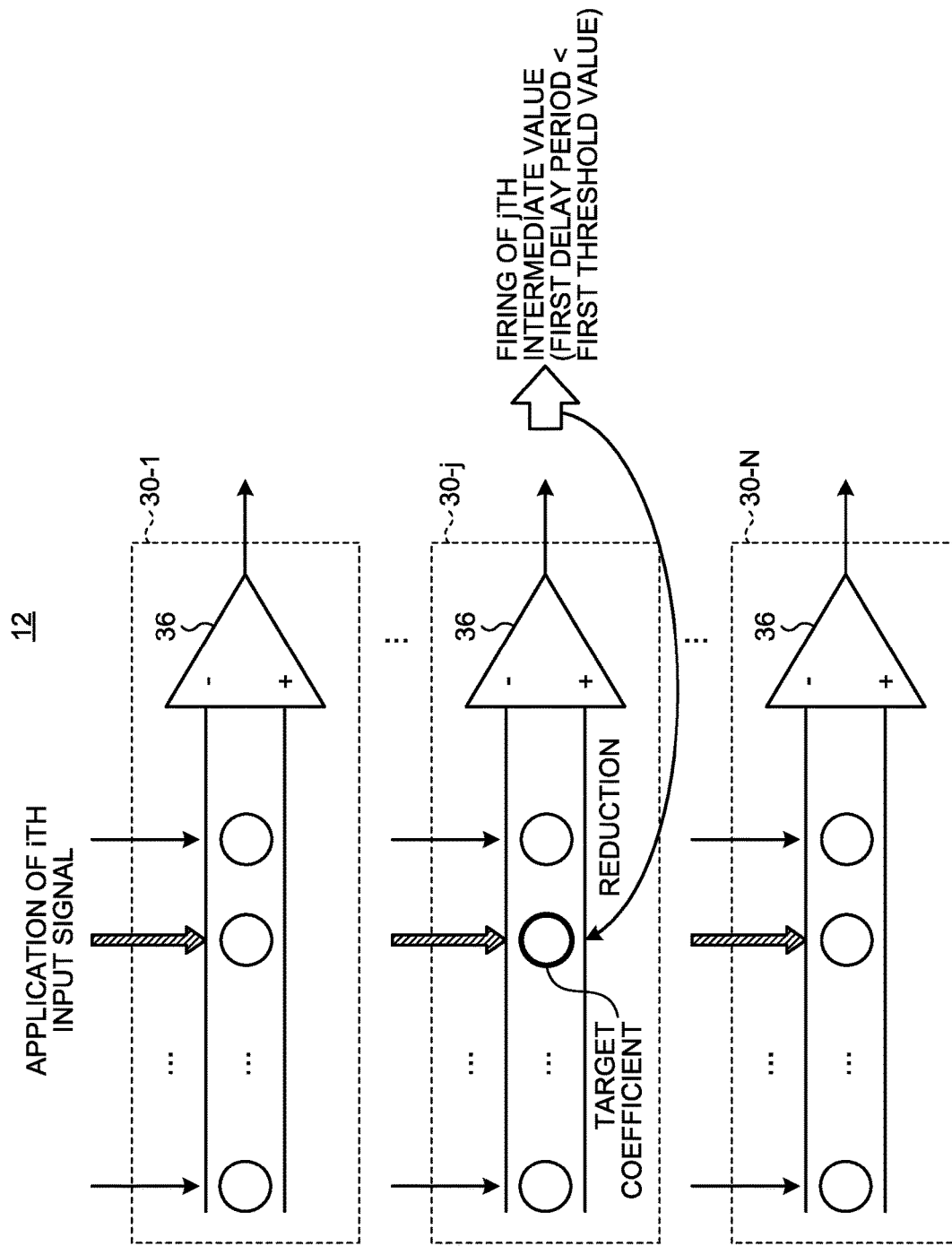
FIG. 12 is a diagram to describe coefficient adjustment of the first delay adjustment processing.

FIG. 12 is a diagram to describe the coefficient adjustment of the first delay adjustment processing. It is assumed, for example, that when the ith input signal is supplied, the reservoir circuit 12 initially causes the jth intermediate signal among the N intermediate signals to be fired. Further, the first delay time period is assumed to be shorter than the first threshold value.

In this case, the control circuit 16 shortens the target coefficient multiplied by the ith input signal among the N coefficients set to the product-sum operation circuit 30 that outputs the jth intermediate signal. In addition, the control circuit 16 may increase the plurality of coefficients other than the target coefficient set to the reservoir circuit 12.

Accordingly, the control circuit 16 is capable of adjusting the plurality of coefficients set to the reservoir circuit 12 so that the first delay time period is long. Because the first delay time period is long, the reservoir circuit 12 is capable of generating N intermediate signals representing the characteristics of the M input signals that are input in a time series.

Therefore, the control circuit 16 is capable of causing the inference circuit 14 to perform inference accurately by making the first delay time period long.

Figure 13:
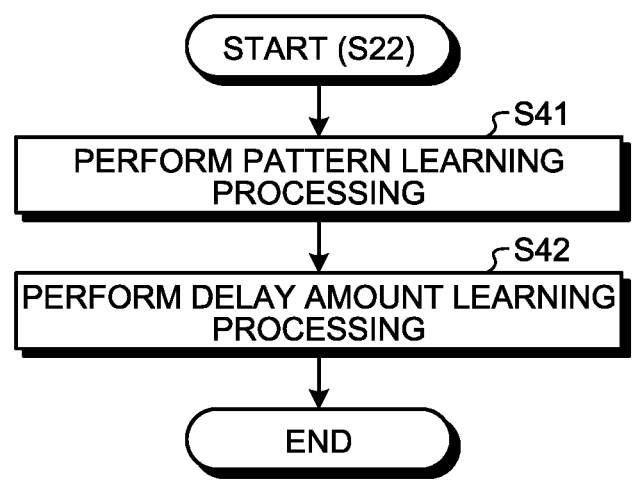
FIG. 13 is a flowchart illustrating the flow of supervised learning processing.

FIG. 13 is a flowchart illustrating the flow of supervised learning processing (S22). The control circuit 16 executes the processing of S41 and S42 below in the supervised learning processing of S22.

First, in S41, the control circuit 16 executes pattern learning processing. More specifically, if M input signals according to training data are supplied to the reservoir circuit 12, the control circuit 16 adjusts the plurality of coefficients set to the inference circuit 14 so that an output signal, indicated in teaching data corresponding to the training data among the L output signals, is fired. For example, the control circuit 16 may execute this pattern learning processing by using the plurality of training data. Note that an example of the pattern learning processing will be described subsequently with reference to FIG. 14.

Thereafter, in S42, the control circuit 16 executes delay amount learning processing. More specifically, if M input signals according to training data are supplied to the reservoir circuit 12, the control circuit 16 adjusts the plurality of coefficients set to the inference circuit 14 so that an output signal, indicated in teaching data corresponding to the training data among the L output signals, is fired sooner. For example, the control circuit 16 may execute delay amount learning processing by using the plurality of training data. Note that further details of the delay amount learning processing will be provided subsequently with reference to FIGS. 15 and 16.

Figure 14:
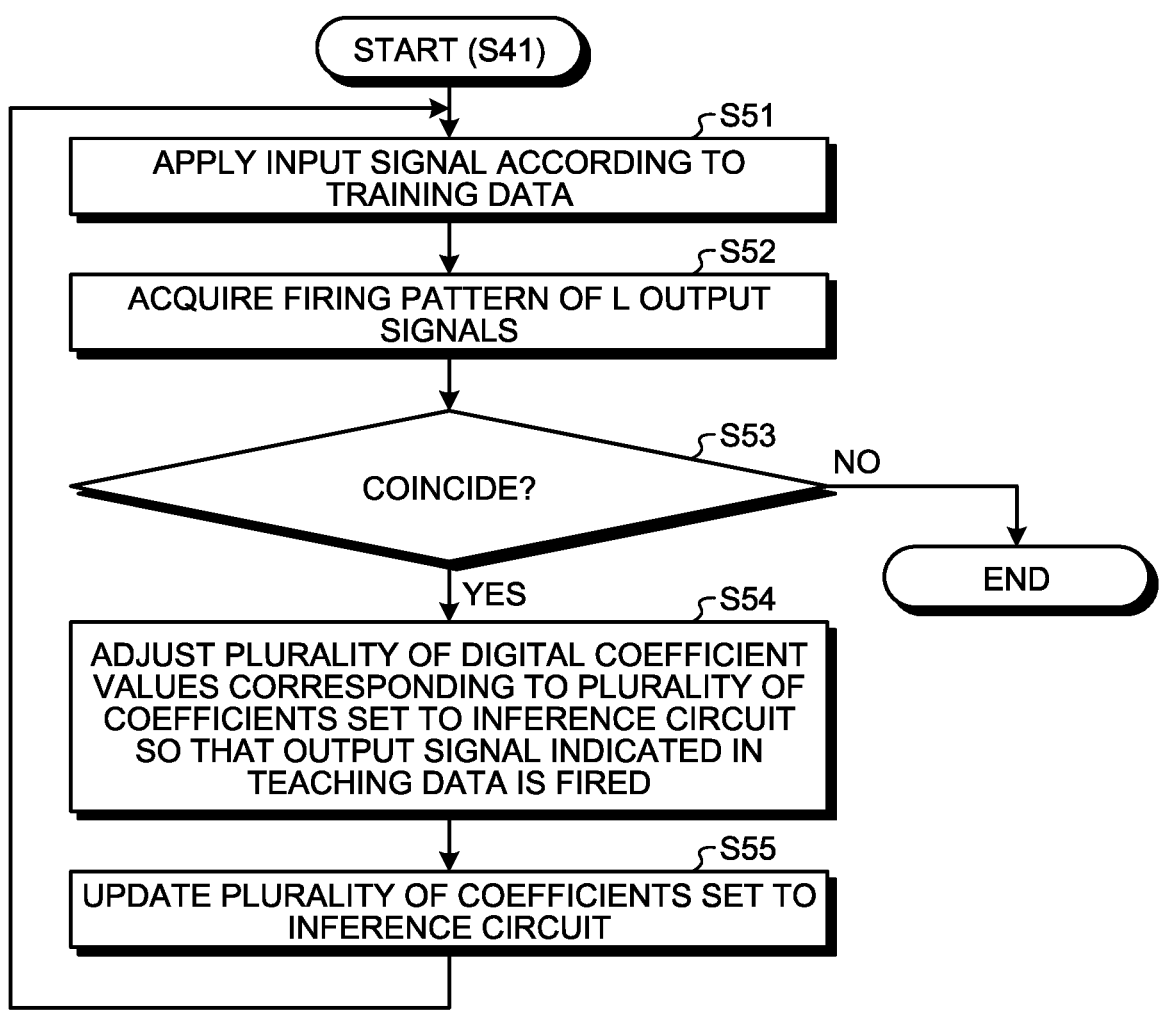
FIG. 14 is a diagram illustrating the flow of pattern learning processing.

FIG. 14 is a flowchart illustrating the flow of pattern learning processing (S41). The control circuit 16 executes, by way of an example, the processing illustrated in FIG. 14 in the pattern learning processing of S41.

First, in S51, the control circuit 16 applies M input signals according to training data to the reservoir circuit 12. Subsequently, in S52, the control circuit 16 acquires patterns for firing the L output signals.

Subsequently, in S53, the control circuit 16 compares the acquired firing pattern with the firing pattern indicated in the teaching data corresponding to the training data and determines whether or not these two patterns coincide with each other. If the two patterns coincide with each other (Yes in S53), the control circuit 16 ends the processing of this flow. If the two patterns do not coincide with each other (No in S53), the control circuit 16 advances the processing to S54.

In S54, the control circuit 16 updates the plurality of digital coefficient values which correspond to the plurality of coefficients set to the inference circuit 14 and stored in the coefficient memory 18. More specifically, the control circuit 16 adjusts the plurality of digital coefficient values corresponding to the plurality of coefficients set to the inference circuit 14 so that the output signal indicated in the teaching data among the L output signals is fired.

Thereafter, in S55, the control circuit 16 updates a plurality of coefficients set to the inference circuit 14 on the basis of the plurality of digital coefficient values stored in the coefficient memory 18.

Upon finishing S55, the control circuit 16 returns the processing to S51 and repeats the processing from S51. The control circuit 16 repeats the processing from S51 to S55 until the firing patterns coincide with each other. After finishing this flow, the control circuit 16 may repeat this flow again by changing the training data.

Figure 15:
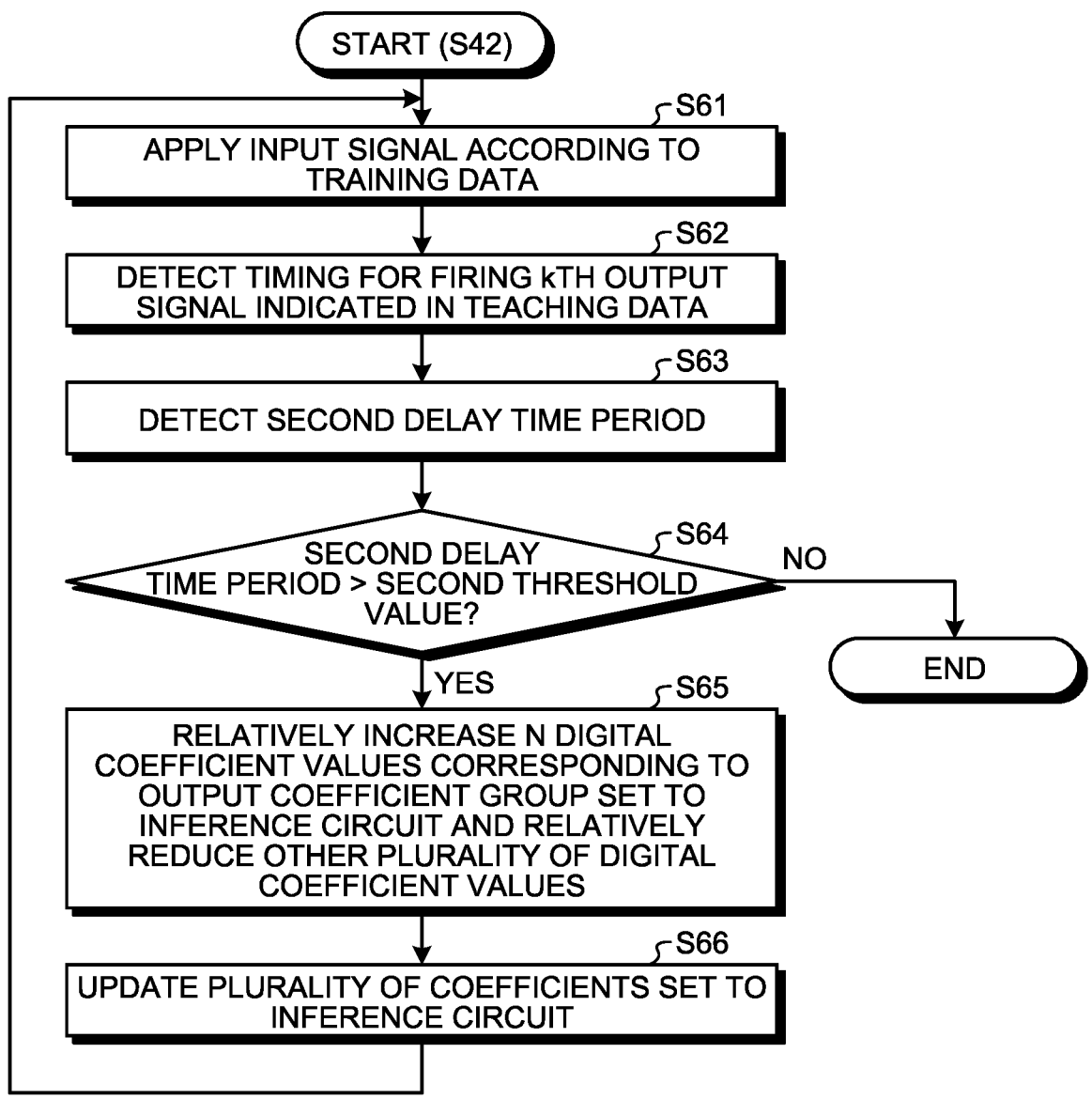
FIG. 15 is a diagram illustrating the flow of delay amount learning processing.

FIG. 15 is a flowchart illustrating the flow of delay amount learning processing (S42). The control circuit 16 executes the processing illustrated in FIG. 15 in the delay amount learning processing of S42.

First, in S61, the control circuit 16 applies M input signals according to training data to the reservoir circuit 12. Thereafter, in S62, the control circuit 16 detects the timing for firing the kth output signal indicated in the teaching data corresponding to the training data among the L output signals.

Thereafter, in S63, the control circuit 16 detects the second delay time period. The second delay time period is a time period extending from the timing for applying M input signals until the timing for firing the kth output signal indicated in the teaching data. Alternatively, the second delay time period may also be a time period extending from the timing for applying the N intermediate signals (the timing when the intermediate signal that was initially fired among the N intermediate signals was supplied to the inference circuit 14) until the timing for firing the kth output signal indicated in the teaching data.

Subsequently, in S64, the control circuit 16 determines whether or not the second delay time period is longer than the preset second threshold value. If the second delay time period is equal to or less than the second threshold value (No in S64), the control circuit 16 ends the processing of this flow. If the second delay time period is longer than the second threshold value (Yes in S64), the control circuit 16 advances the processing to S65.

In S65, the control circuit 16 updates the plurality of digital coefficient values which correspond to the plurality of coefficients set to the inference circuit 14 and stored in the coefficient memory 18. More specifically, the control circuit 16 relatively increases the plurality of digital coefficient values corresponding to the output coefficient group and relatively reduces the plurality of digital coefficient values corresponding to the coefficient group other than the output coefficient group. The output coefficient group is N coefficients that are set to the product-sum operation circuit 30 that outputs the kth output signal among the L product-sum operation circuits 30 included in the inference circuit 14.

For example, the control circuit 16 may increase the plurality of digital coefficient values corresponding to the output coefficient group and does not necessarily change the plurality of digital coefficient values corresponding to the coefficient group other than the output coefficient group. For example, the control circuit 16 does not necessarily change the plurality of digital coefficient values corresponding to the output coefficient group and may reduce the plurality of digital coefficient values corresponding to the coefficient group other than the output coefficient group. For example, the control circuit 16 may increase the plurality of digital coefficient values corresponding to a portion of the output coefficient group and reduce the plurality of digital coefficient values corresponding to a portion of the coefficient group other than the output coefficient group. In addition, as the second delay time period increases, the control circuit 16 may increase the relative increase amount of the plurality of digital coefficient values corresponding to the output coefficient group and increase the relative reduction amount of the plurality of digital coefficient values corresponding to the coefficient group other than the output coefficient group.

Thereafter, in S66, the control circuit 16 updates a plurality of coefficients set to the inference circuit 14 on the basis of the plurality of digital coefficient values stored in the coefficient memory 18.

Upon finishing S66, the control circuit 16 returns the processing to S61 and repeats the processing from S61. The control circuit 16 repeats the processing from S61 to S66 until the second delay time period is equal to or less than the second threshold value, or until a predetermined time period has elapsed or until loop processing equivalent to a predetermined number of loops is executed. After finishing this flow, the control circuit 16 may repeat this flow again by changing the training data.

Figure 16:
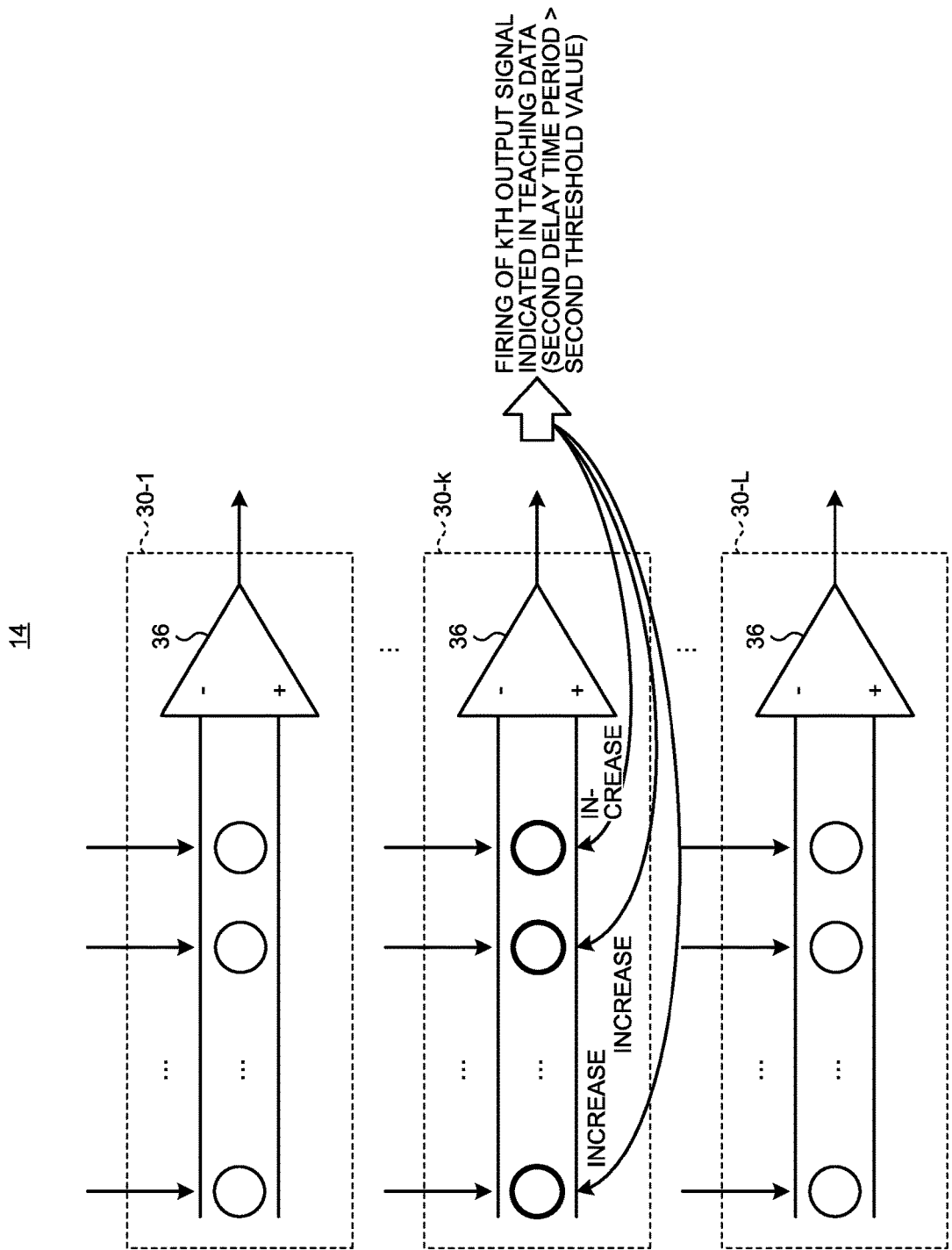
FIG. 16 is a diagram to describe delay amount learning processing.

FIG. 16 is a diagram to describe the coefficient adjustment of the delay amount learning processing. It is assumed, for example, that if M input signals according to the training data are supplied to the reservoir circuit 12, the inference circuit 14 causes the kth output signal indicated in the teaching data among the L output signals to be fired. Further, the second delay time period is assumed to be longer than the second threshold value.

In this case, the control circuit 16 increases the output coefficient group, which is N coefficients that are set to the product-sum operation circuit 30 that outputs the kth output signal among the L product-sum operation circuits 30 included in the inference circuit 14. Further, the control circuit 16 may reduce the plurality of coefficients set to the product-sum operation circuits 30 other than the product-sum operation circuit 30 that outputs the kth output signal among the L product-sum operation circuits 30 included in the inference circuit 14.

Accordingly, the control circuit 16 is capable of adjusting the plurality of coefficients set to the inference circuit 14 so that the second delay time period is short. When the second delay time period is short, the inference circuit 14 is capable of outputting the inference result early. Therefore, the control circuit 16 is capable of causing the inference circuit 14 to perform inference promptly by making the second delay time period short.

Figure 17:
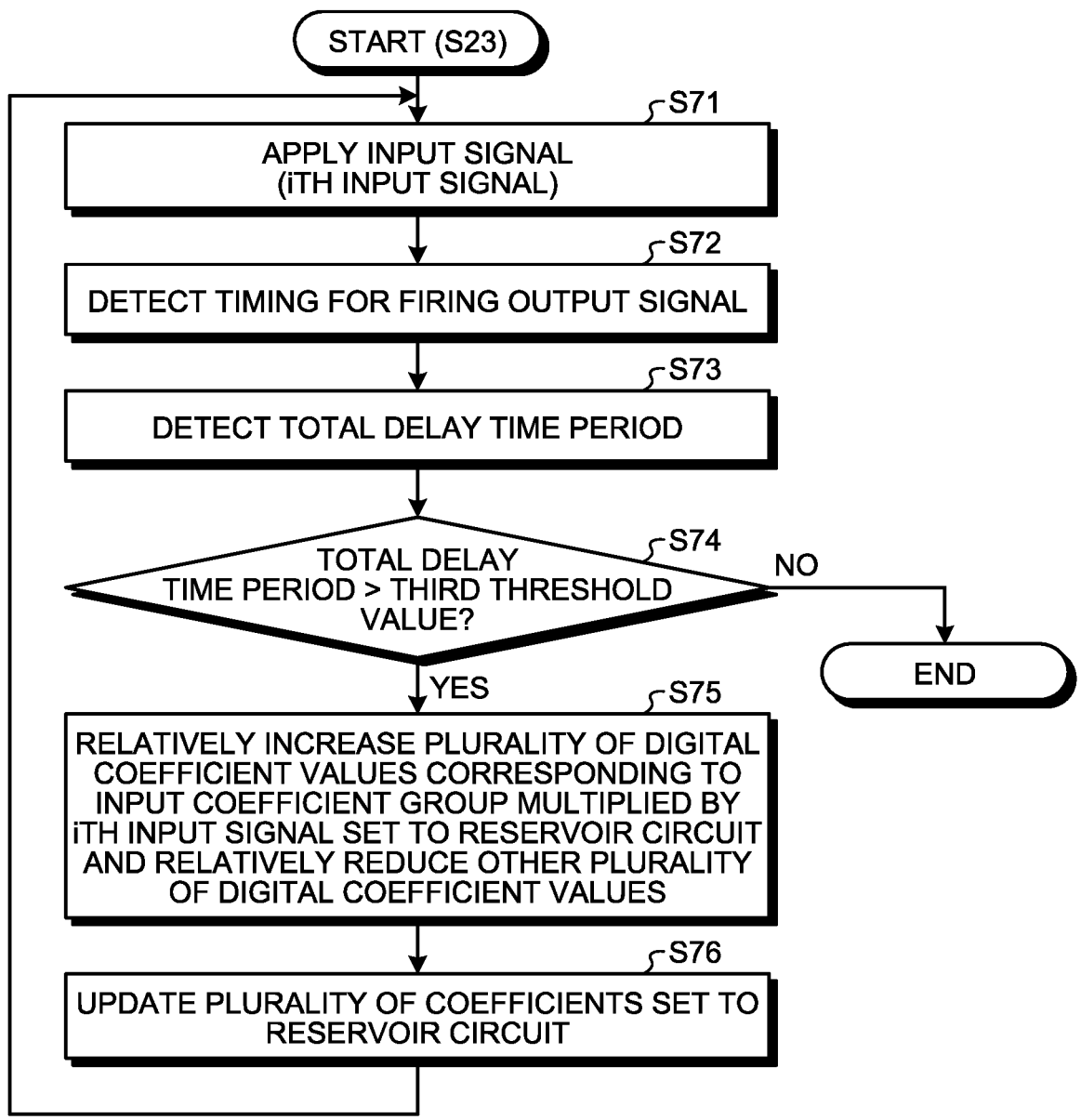
FIG. 17 is a flowchart illustrating the flow of second delay adjustment processing.

FIG. 17 is a flowchart illustrating the flow of second delay adjustment processing (S23). The control circuit 16 executes the processing illustrated in FIG. 17 in the second delay adjustment processing of S23.

First, in S71, the control circuit 16 applies an ith input signal to the reservoir circuit 12. For example, the control circuit 16 changes the ith input signal among the M input signals from the first logical value to the second logical value.

Subsequently, in S72, the control circuit 16 detects the timing for firing the output signals.

Thereafter, in S73, the control circuit 16 detects the total delay time period. The total delay time period is a time period extending from the timing for applying the M input signals (the timing for applying the ith input signal) until the timing for firing any output signal among the L output signals.

Subsequently, in S74, the control circuit 16 determines whether or not the total delay time period is longer than the preset third threshold value. If the total delay time period is equal to or less than the third threshold value (No in S74), the control circuit 16 ends the processing of this flow. If the total delay time period is longer than the third threshold value (Yes in S74), the control circuit 16 advances the processing to S75.

In S75, the control circuit 16 updates the plurality of digital coefficient values which correspond to the plurality of coefficients set to the reservoir circuit 12 and stored in the coefficient memory 18. More specifically, the control circuit 16 relatively increases the plurality of digital coefficient values corresponding to the input coefficient group and relatively reduces the plurality of digital coefficient values corresponding to the coefficient group other than the input coefficient group. The input coefficient group is a coefficient group that is applied to the ith input signal among the plurality of coefficients set to the reservoir circuit 12.

For example, the control circuit 16 may increase the plurality of digital coefficient values corresponding to the input coefficient group and does not necessarily change the plurality of digital coefficient values corresponding to the coefficient group other than the input coefficient group. For example, the control circuit 16 does not necessarily change the plurality of digital coefficient values corresponding to the input coefficient group and may reduce the plurality of digital coefficient values corresponding to the coefficient group other than the input coefficient group. For example, the control circuit 16 may increase the plurality of digital coefficient values corresponding to a portion of the input coefficient group and reduce the plurality of digital coefficient values corresponding to a portion of the coefficient group other than the input coefficient group. In addition, as the total delay time period increases, the control circuit 16 may increase the relative increase amount of the plurality of digital coefficient values corresponding to the input coefficient group and increase the relative reduction amount of the plurality of digital coefficient values corresponding to the coefficient group other than the input coefficient group.

Thereafter, in S76, the control circuit 16 updates a plurality of coefficients set to the reservoir circuit 12 on the basis of the plurality of digital coefficient values stored in the coefficient memory 18.

Upon finishing S76, the control circuit 16 returns the processing to S71 and repeats the processing from S71. The control circuit 16 repeats the processing from S71 to S76 until the total delay time period is equal to or less than the second threshold value, or until a predetermined time period has elapsed or until loop processing equivalent to a predetermined number of loops is executed.

After finishing this flow, the control circuit 16 may repeat this flow again by changing the input signals applied. For example, the control circuit 16 may execute this flow for all the N input signals.

Figure 18:
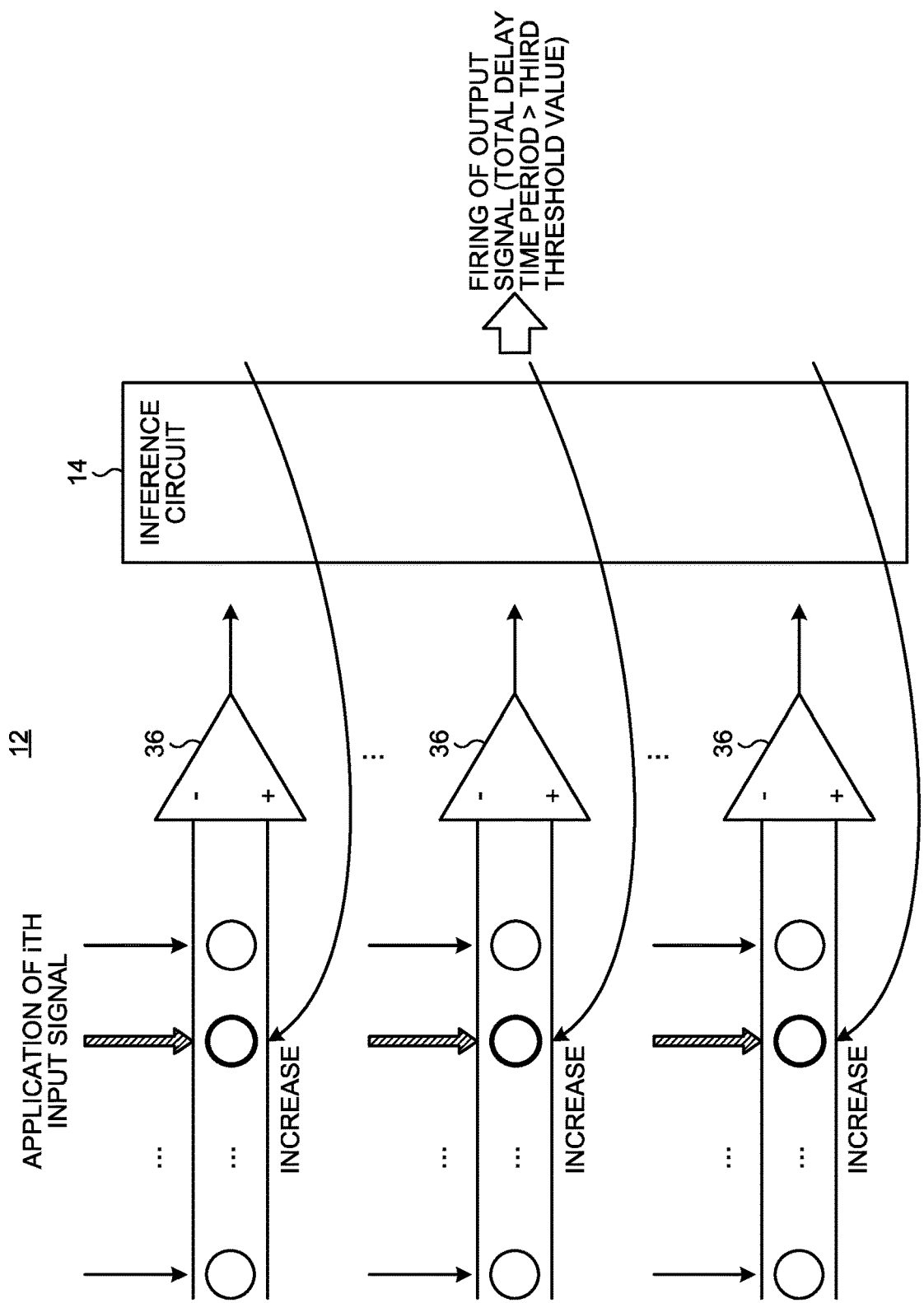
FIG. 18 is a diagram to describe the second delay adjustment processing of the reservoir circuit.

FIG. 18 is a diagram to describe the coefficient adjustment of the delay amount learning processing. It is assumed, for example, that when the ith input signal is supplied, the inference circuit 14 causes any output signal among the L output signals to be fired. Further, the total delay time period is assumed to be longer than the third threshold value.

In this case, the control circuit 16 increases the coefficient multiplied by the ith input signal set to each of the N product-sum operation circuits 30 which the reservoir circuit 12 includes. Furthermore, the control circuit 16 may reduce the plurality of coefficients other than the coefficient multiplied by the ith input signal.

Accordingly, the control circuit 16 is capable of adjusting the plurality of coefficients set to the reservoir circuit 12 so that the total delay time period becomes short. When the total delay time period is short, the inference circuit 14 is capable of outputting the inference result early. Therefore, the control circuit 16 can perform prompt coefficient adjustment for transforming the input signal into an inferenceable signal accurately by shortening the total delay time period.

Figure 19:
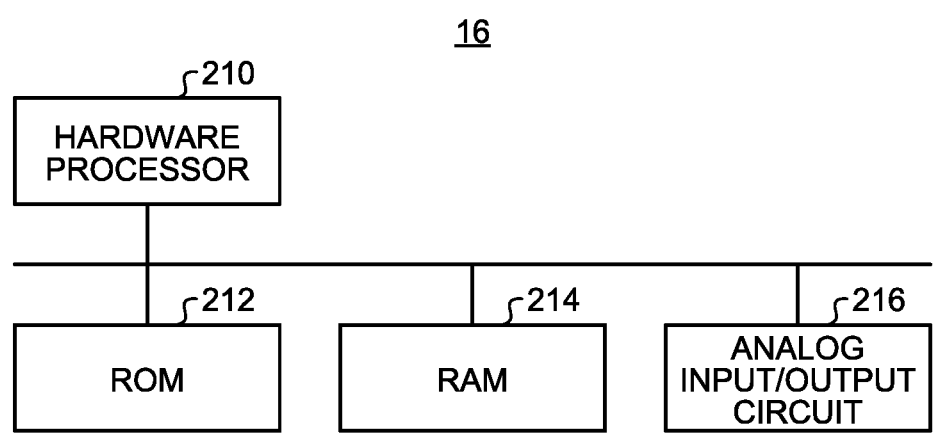
FIG. 19 is a diagram to describe a hardware configuration of the control circuit.

FIG. 19 is a diagram illustrating a hardware configuration of the control circuit 16. The control circuit 16 is realized by a processing circuit with a hardware configuration as illustrated in FIG. 19, for example.

The control circuit 16 includes a hardware processor 210, a ROM (Read Only Memory) 212, a RAM (Random Access Memory) 214, and an analog input/output circuit 216. The hardware processor 210, ROM 212, RAM 214, and the analog input/output circuit 216 are connected by a bus.

The hardware processor 210 develops and executes a program in the RAM 214, controls each portion to perform inputting/outputting, and performs data processing. The ROM 212 stores the program. The RAM 214 functions as a working area of the hardware processor 210. The analog input/output circuit 216 acquires the M input signals, the N intermediate signals, and the L output signals and detects the application timings and firing timings for the respective signals.

The program executed by the control circuit 16 includes a first setting module, a second setting module, a first delay detection module, a first update module, a pattern adjustment module, a second delay detection module, a second update module, a third delay detection module, and a third update module. The control circuit 16 loads each module onto a main storage device (the RAM 214) as a result of executing the program by the hardware processor 210. Accordingly, the processor (the hardware processor 210) functions as the first setting unit 122, the second setting unit 124, the first delay detection unit 132, the first update unit 134, the pattern adjustment unit 136, the second delay detection unit 138, the second update unit 140, the third delay detection unit 142, and the third update unit 144. Note that some of the first setting unit 122, the second setting unit 124, the first delay detection unit 132, the first update unit 134, the pattern adjustment unit 136, the second delay detection unit 138, the second update unit 140, the third delay detection unit 142, and the third update unit 144 may be realized by hardware other than the control circuit 16.

As described hereinabove, the inference system 10 according to the present embodiment enables inference to be performed accurately irrespective of the task to be handled, the type of data, and the like. Moreover, the inference system 10 enables inference to be performed at high speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inference system, comprising:
   a recurrent neural network circuit that receives M input signals and outputs N intermediate signals, M being an integer of 2 or more, N being an integer of 2 or more;
   an inference neural network circuit that receives the N intermediate signals and outputs L output signals, L being an integer of 2 or more; and
   a control circuit that adjusts a plurality of coefficients set to the inference neural network circuit, wherein
   the control circuit adjusts the plurality of coefficients set to the inference neural network circuit according to a delay time period from timing for applying the M input signals or from timing for applying the N intermediate signals until timing for firing the L output signals.

2. The inference system according to claim 1, wherein the M input signals each represent a binary value, the N intermediate signals each represent a binary value, and the L output signals each represent a binary value.

3. The inference system according to claim 2, wherein
the inference neural network circuit includes L product-sum operation circuits corresponding to the L output signals,
with respect to each of the L product-sum operation circuits, N coefficients corresponding to the N intermediate signals are set,
if the Mth input signal according to training data is applied to the recurrent neural network circuit and the inference neural network circuit causes a kth output signal, for which k is an integer of 1 or more and L or less and which is indicated in teaching data among the L output signals, to be fired, the control circuit adjusts, according to the delay time period, a relative relationship between an output coefficient group among the plurality of coefficients that are set to the inference neural network circuit and a coefficient group other than the output coefficient group among the plurality of coefficients set to the inference neural network circuit, and
the output coefficient group is the N coefficients set to a product-sum operation circuit that outputs the kth output signal among the L product-sum operation circuits included in the inference neural network circuit.

4. The inference system according to claim 3, wherein
if the delay time period is longer than a preset threshold value, the control circuit relatively increases the output coefficient group and relatively reduces the coefficient group other than the output coefficient group, and
as the delay time period increases, the control circuit increases a relative increase amount of the output coefficient group and increases a relative reduction amount of the coefficient group other than the output coefficient group.

5. The inference system according to claim 4, wherein, if the M input signals according to the training data are supplied to the recurrent neural network circuit, the control circuit adjusts a plurality of coefficients set to the inference neural network circuit so that an output signal indicated in the teaching data among the L output signals is fired.

6. The inference system according to claim 1, wherein the inference neural network circuit includes:
a second operation circuit that receives the N intermediate signals and executes a neural network operation that outputs L signals, and
an output circuit that generates the L output signals corresponding to the L signals that are output from the second operation circuit, and
the output circuit causes each of the L output signals to be fired according to a firing pattern for a corresponding signal among the L signals.

7. An inference system, comprising:
a recurrent neural network circuit that receives M input signals and outputs N intermediate signals, M being an integer of 2 or more, N being an integer of 2 or more;
an inference neural network circuit that receives the N intermediate signals and outputs L output signals, L being an integer of 2 or more; and
a control circuit that adjusts a plurality of coefficients set to the recurrent neural network circuit, wherein
the control circuit adjusts the plurality of coefficients set to the recurrent neural network circuit according to a delay time period from timing for applying the M input signals until timing for firing the L output signals.

8. The inference system according to claim 7, wherein
the M input signals each represent a binary value,
the N intermediate signals each represent a binary value,
the L output signals each represent a binary value,
the recurrent neural network circuit includes N product-sum operation circuits corresponding to the N intermediate signals,
with respect to each of the N product-sum operation circuits, M coefficients corresponding to the M input signals are set,
if an ith input signal, for which i is an integer of 1 or more and M or less, among the M input signals is applied to the recurrent neural network circuit, the control circuit adjusts, according to the delay time period, a relative relationship between an input coefficient group set to the recurrent neural network circuit and a coefficient group other than the input coefficient group set to the recurrent neural network circuit, and
the input coefficient group is a coefficient group that is multiplied by the ith input signal among the plurality of coefficients set to the recurrent neural network circuit.

9. The inference system according to claim 8, wherein
the N product-sum operation circuits each include a comparator, which receives a voltage according to a value obtained by performing a product-sum operation with respect to the M input signals and the set M coefficients, binarizes the received voltage, and outputs a binarized signal as the corresponding intermediate signal among the N intermediate signals.

10. The inference system according to claim 9, wherein,
if the delay time period is longer than a preset threshold value, the control circuit relatively increases the input coefficient group and relatively reduces the coefficient group other than the input coefficient group.

11. The inference system according to claim 10, wherein,
as the delay time period increases, the control circuit increases a relative increase amount of the input coefficient group and increases a relative reduction amount of the coefficient group other than the input coefficient group.

12. The inference system according to claim 8, wherein,
if the ith input signal is applied to the recurrent neural network circuit and the recurrent neural network circuit causes a jth intermediate signal, for which j is an integer of 1 or more and N or less, among the N intermediate signals to be fired, the control circuit adjusts, according to a first delay time period from timing for applying the M input signals until timing for firing the N intermediate signals, a relative relationship between a target coefficient among a plurality of coefficients set to the recurrent neural network circuit and a coefficient group other than the target coefficient, and
the target coefficient is a coefficient that is multiplied by the ith input signal among the M coefficients set to a product-sum operation circuit that outputs the jth output signal among the N product-sum operation circuits included in the recurrent neural network circuit.

13. A parameter controlling method adopted in an inference system including a recurrent neural network circuit that receives M input signals and outputs N intermediate signals, M being an integer of 2 or more, N being an integer of 2 or more, and including an inference neural network circuit that receives the N intermediate signals and outputs L output signals, L being an integer of 2 or more, the method comprising:
adjusting a plurality of coefficients set to the inference neural network circuit according to a delay time period from timing for applying the M input signals or from timing for applying the N intermediate signals until timing for firing the L output signals.

14. A parameter controlling method adopted in an inference system including a recurrent neural network circuit that receives M input signals and outputs N intermediate signals, M being an integer of 2 or more, N being an integer of 2 or more, and an inference neural network circuit that receives the N intermediate signals and outputs L output signals, L being an integer of 2 or more, the method comprising:
  adjusting a plurality of coefficients set to the recurrent neural network circuit according to a delay time period from timing for applying the M input signals until timing for firing the L output signals.

15. A parameter controlling method adopted in a recurrent neural network circuit that receives M first signals and outputs N second signals, M being an integer of 2 or more, N being an integer of 2 or more, the method comprising:
  adjusting a plurality of coefficients that are set to the recurrent neural network circuit according to a first delay time period from timing for applying the M first signals until timing for firing the N second signals.

* * * * *